US007536643B2

(12) United States Patent
Zhu et al.

(10) Patent No.: US 7,536,643 B2
(45) Date of Patent: May 19, 2009

(54) INTERFACE FOR COMPRESSED VIDEO DATA ANALYSIS

(75) Inventors: Shan Zhu, San Jose, CA (US); Ji Zhang, San Jose, CA (US); Jiandong Shen, Santa Clara, CA (US); Hain-Ching Liu, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 564 days.

(21) Appl. No.: 11/206,475

(22) Filed: Aug. 17, 2005

(65) Prior Publication Data

US 2005/0278635 A1    Dec. 15, 2005

(51) Int. Cl.
 G06F 3/00    (2006.01)
(52) U.S. Cl. .................. 715/719; 715/716; 382/232
(58) Field of Classification Search .......... 715/716, 715/719, 723, 764, 781, 230, 233; 348/700; 382/232, 233, 251; 386/4, 46, 52, 55
See application file for complete search history.

(56) References Cited

U.S. PATENT DOCUMENTS

| | | | | |
|---|---|---|---|---|
| 5,522,036 | A | * | 5/1996 | Shapiro ...................... 714/38 |
| 5,627,765 | A | * | 5/1997 | Robotham et al. .......... 708/203 |
| 5,774,593 | A | | 6/1998 | Zick et al. |
| 5,874,952 | A | | 2/1999 | Morgan |
| 5,963,203 | A | | 10/1999 | Goldberg et al. |
| 6,134,547 | A | | 10/2000 | Huxley et al. |
| 6,144,375 | A | * | 11/2000 | Jain et al. .................... 715/251 |
| 6,166,735 | A | | 12/2000 | Dom et al. |
| 6,185,363 | B1 | | 2/2001 | Dimitrova et al. |
| 6,292,589 | B1 | | 9/2001 | Chow et al. |
| 6,335,736 | B1 | | 1/2002 | Wagner et al. |
| 6,356,285 | B1 | | 3/2002 | Burkwald et al. |
| 6,392,710 | B1 | | 5/2002 | Gonsalves et al. |
| 6,426,778 | B1 | | 7/2002 | Valdez, Jr. |
| 6,496,228 | B1 | | 12/2002 | McGee et al. |
| 6,539,124 | B2 | | 3/2003 | Sethuraman et al. |
| 6,614,935 | B2 | | 9/2003 | Rajagopalan et al. |
| 6,850,565 | B2 | * | 2/2005 | Martins et al. .......... 375/240.03 |
| 7,143,353 | B2 | * | 11/2006 | McGee et al. .............. 715/723 |
| 7,277,483 | B1 | * | 10/2007 | Eckart .................... 375/240.03 |

(Continued)

OTHER PUBLICATIONS

ISO/IEP "*Information Technology-Generic Coding Of Moving Pictures And Associated Audio Information: Video*", ISO/IEC 13818-2, 1995, 209 pages.

(Continued)

*Primary Examiner*—X. L Bautista
(74) *Attorney, Agent, or Firm*—Weaver Austin Villeneuve & Sampson LLP

(57) ABSTRACT

The invention described herein provides a video analysis tool to assist a computer programmer working on a program that effects video data. The tool may be integrated with program code. When enacted, the tool obtains statistical information related to the video data and information corresponding to functions of the code. The code may be responsible for encoding, transcoding, and/or decoding video data, for example. The tool is integrated with a video decoder to allow the information to be output with raw video data. The present invention is particularly useful for developing, debugging and analyzing programs responsible for encoding, transcoding, and/or decoding video data, such as video data compressed according to an MPEG standard.

24 Claims, 26 Drawing Sheets

U.S. PATENT DOCUMENTS

2002/0108112 A1* 8/2002 Wallace et al. ................ 725/40
2002/0163532 A1* 11/2002 Thomas et al. .............. 345/723
2003/0177503 A1* 9/2003 Sull et al. ................... 725/112
2004/0027369 A1 2/2004 Kellock et al.

OTHER PUBLICATIONS

"Daikin for DV's DVD Suite", Jan. 1998, One to One, n1, p. 18.
"NHK Develops HDTV Transmission Path Test Equipment", Nov. 1991, Newswire, Comline Telecommunications, p. 3.
Ron Burdett et al., "DVD Authoring Tips", Aug. 1998, Broadcast Engineering, v40, n9, pp. 48-50.
"Visual Numerics Announces Availability of Image Processing Toolkit for PV-Wave", Jan. 1997, News Release.
"Sonic Awarded Patent on Sonic DVD Creator and Sonic Desktop DVD Video Encoding Technology", Nov. 1998, Business Wire p. 0022.
"MPEG Repair", 2000, PixelTools Corp.
David Leathers, "The Pixel Tools World of MPEG", Jun. 1999, Videography, p. 94-98.
"Intel Leads Intercast Alliance for Digitized TV", Oct. 1995, Newsbytes News Network.
"Sensormatic Acquires Saker Trax, a Leading Developer of Object Tracking Technology; Acquisition Further Broadens Company's Extensive Video Surveillance Offerings", Sep. 2000, Business Wire, p. 2447.
Shell Haffner, "Networked Desktop Commercial/Industrial Use of Video: The Real Impact, the Real Issues", Sep. 1995, Advanced Imaging, v10, n9, p. 47(5).
"Virage Announces Broad Cross-Industry Adoption of Fifth Generation Customers and 60 Independent Software Developers Worldwide", Nov. 2001, PR Newswire.
Gang Wei, "Tracking Faces of Arbitrary Views for Video Annotation", Jan. 2001, Visual Communications and Image Processing, vol. 4310, p. 574-582.

* cited by examiner

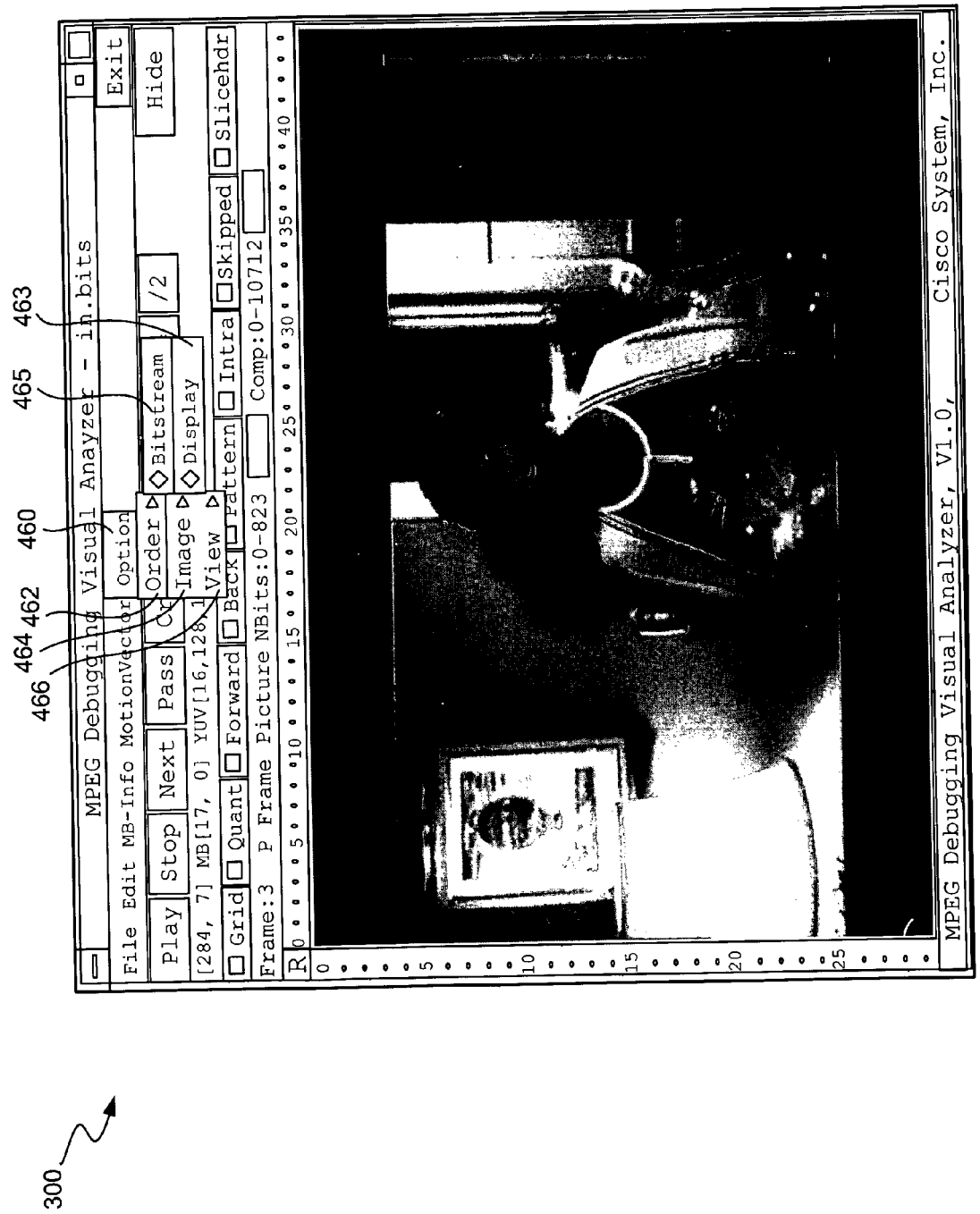

INTERFACE FOR COMPRESSED VIDEO DATA ANALYSIS

RELATED APPLICATION DATA

The present application is a claims priority under U.S.C. 120 from U.S. patent application Ser. No. 10/013,967, entitled "INTERFACE FOR COMPRESSED VIDEO DATA ANALYSIS" filed on Dec. 10, 2001, which is incorporated herein by reference in its entirety for all purposes.

FIELD OF THE INVENTION

The present invention relates generally to user software running on computers or computer systems. More specifically, the invention relates to user interface systems and methods used in examining and analyzing compressed video data and computer programs that manipulate video data.

BACKGROUND OF THE INVENTION

Computer programming is typically a process of program generation, editing, debugging, and analysis of editing effects. Typically, editing involves numerous stages of adding, removing, or changing code—and analyzing the effects of each editing stage. The iterative nature of program editing commonly makes it a time consuming and tiring process.

Digital video is a growing application. Programmers working in digital video are commonly called upon to develop programs that affect video data. For example, compression of video data is an approach that has been used to make digital video images more transportable. Digital video compression schemes allow digitized video frames to be represented digitally in a much more efficient manner. Digital video programmers are thus frequently called upon to generate, edit, debug, and analyze code for wide variety of purposes in the areas of digital video encoding, transcoding, and decoding.

Current programmers working in MPEG video compression rely on output video as a mechanism for program analysis. Since conventional decoders do not produce any information other than raw video, this type of analysis restricts a programmer to qualitative visual feedback of program efficacy. As editing may produce minor changes in output video outside a person's visual detection capabilities, raw video viewing may not be suitable in many cases. Some programmers output raw data, e.g. a large amount of numbers, to assist in analysis. This typically requires a programmer to wastefully print out large arrays of numbers. Given the large amount of information in a single video frame, and that a single line of code may process many frames at a single time, printing out large arrays of numbers is not a proficient manner of program efficacy detection. For example, it is often hard for a programmer to pinpoint a bug within these large arrays.

In view of the foregoing, an improved mechanism for video programming analysis would be highly beneficial.

SUMMARY OF THE INVENTION

The present invention provides a video analysis tool to assist a computer programmer working on a program that effects video data. In one embodiment, the tool is integrated with program code. When enacted, the tool obtains information related to the video data and information corresponding to functions of the code. For example, the code may be responsible for encoding, transcoding, and/or decoding video data. In this case, the tool obtains information related to the encoding, transcoding, and/or decoding. The tool is also integrated with a video decoder to allow the information to be output with raw video data. The present invention is particularly useful for developing, debugging and analyzing programs responsible for encoding, transcoding, and/or decoding video data, such as video data compressed according to an MPEG standard.

In one aspect, the present invention provides a combination of functionality useful for many video programming applications that is provided in a simple and easy to use computer interface. This is in contrast to available user interfaces, even those developed to handle raw video applications, that do not provide a suite of particular programming and statistical compression analysis tools that allow a user to determine and compare programming compression features with minimal effort.

In another aspect, the present invention relates to an analysis tool for analyzing video data and compressed video data information. The analysis tool includes a processor and a display for presenting a video image. The analysis tool comprises a first display control permitting a user to display a segmentation for the video data according to a compression structure. The analysis tool also comprises a second display control permitting the user to control whether a particular compression feature is displayed in a segment. The analysis tool further comprises a third display control permitting the user to obtain compressed video data information for a segment. The analysis tool may also allow a user to display picture-level information and statistical results.

In another aspect, the present invention relates to a method implemented on a computer system. The method comprises integrating a video data analysis tool with a video-processing program. The method comprises processing a bitstream comprising compressed video data. The method further comprises receiving a break point at a location in a program. The method also comprises calling an image analysis tool when the break point is reached. The method additionally comprises obtaining compressed video data information from the bitstream. The method also comprises visually outputting the compressed video data information using the image analysis tool.

In another aspect, the present invention relates to computer program product comprising a computer readable medium and program instructions provided via the computer readable medium. The program instructions comprising instructions for providing an image analysis tool presented on a display associated with the computer system. The instructions specifying processing a bitstream comprising compressed video data. The instructions further specifying receiving a break point at a location in a program. The instructions also specifying calling an image analysis tool when the break point is reached. The instructions additionally specifying obtaining compressed video data information from the bitstream. The instructions also specifying visually outputting the compressed video data information using the image analysis tool.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5E illustrates an option pop-up menu tool that permits a user to vary the display order of images included in the analysis tool of FIG. 1.

DETAILED DESCRIPTION

Figure 1:
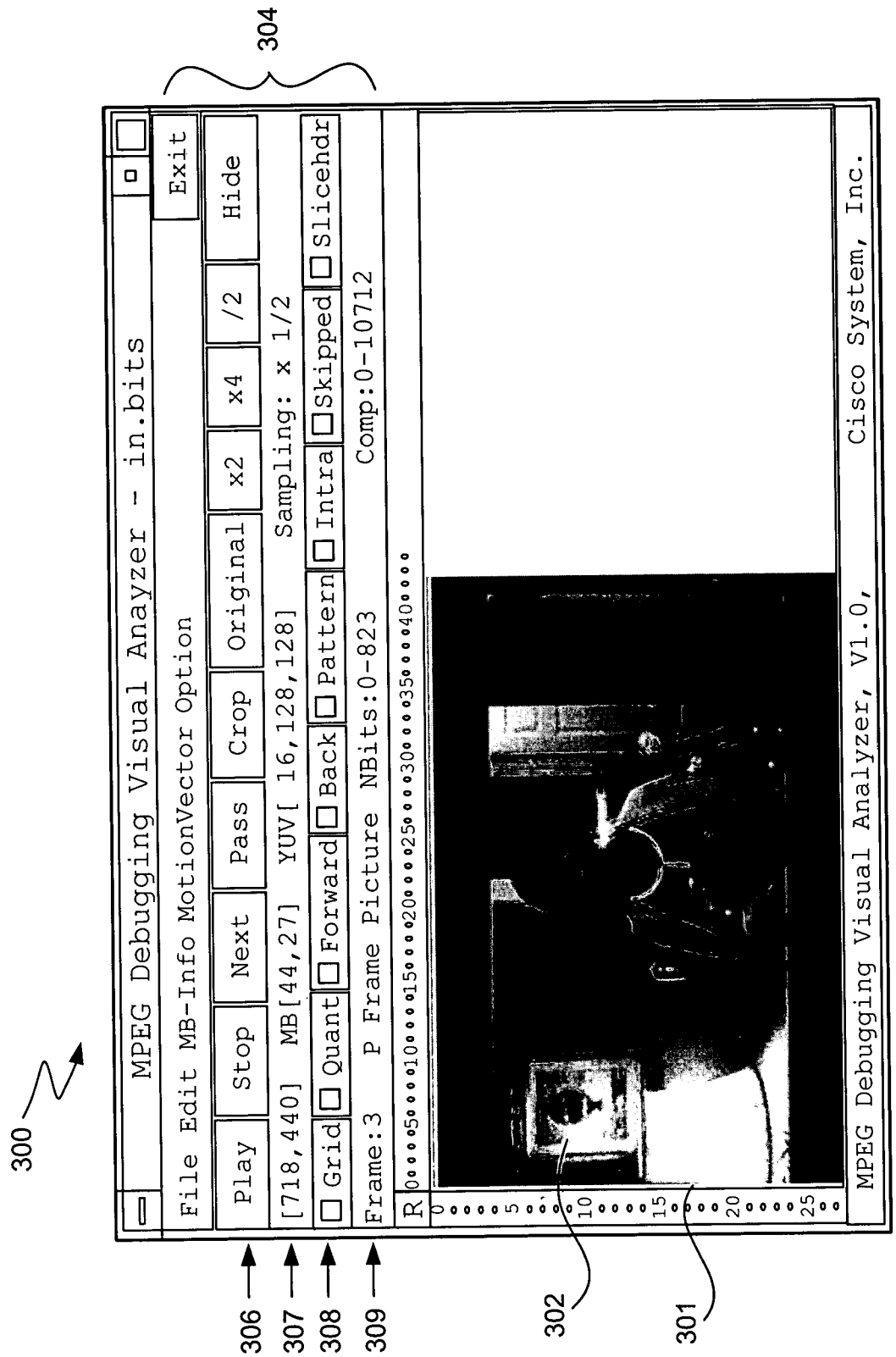
FIG. 1 illustrates a video data analysis tool having a number of display tools in accordance with a specific embodiment of this invention.

In the following detailed description of the present invention, numerous specific embodiments are set forth in order to provide a thorough understanding of the invention. However, as will be apparent to those skilled in the art, the present invention may be practiced without these specific details or by using alternate elements or processes. In other instances well known processes, procedures, components, and circuits have not been described in detail so as not to unnecessarily obscure aspects of the present invention.

In accordance with one embodiment of the present invention, a graphical user interface (GUI) is provided which allows the user to perform numerous operations suitable for program and video data analysis. The GUI allows easy use of windows, control icons, etc. to display information to the user. The data displayed in a window may be of different types. Some may be graphical, such as icons or pictures, or textual, such as a numerical array, or a combination of both. The GUI displays various video data related display tools and functions. To handle the vast amount of information a video image after compression and decompression, for example, the GUI analysis tool offers one or more display tools to display features associated with the compression and decompression.

A time-consuming and often frustrating step in programming is debugging. Advantageously, the GUI of this invention provides a visual tool for facilitating the debugging process. Using the GUI of this invention, a user may debug code, analyze program efficacy and perform a wide variety of checks on complex images conveniently and efficiently. In addition, the present invention may allow the user to gather useful information about raw video, video compression data, and/or statistics related to compression of the video. In one embodiment, a programmer developing a program may insert a checkpoint at a particular line in the code. The check point then calls upon the GUI to output video data at the current stage of the program.

The present invention is particularly useful as a development, analysis and debugging tool that assists programmers working on programs effecting video data that is at some point expected to be encoded, transcoded or decoded according to an MPEG standard. Compression according to the MPEG-2 standards will first be briefly described in order to facilitate the following description of one embodiment of the present invention. While the present invention will now primarily be described in terms of compression information relevant to the MPEG-2 standards, the present invention may be useful to other video compression and packaging schemes. Other compression standards suitable for use with the present invention may include MPEG-X compression, H.26X compression for video conferencing, compression using proprietary video stream formats, compression that uses the C programming language, or any other compression formats that use block based compression.

The MPEG compression standard phase 2 (MPEG-2) consists of Systems, Video, Audio and other relevant parts. The MPEG-2 standard on Systems defines two data stream formats: the Transport Stream and the Program Stream. The Transport Stream can carry multiple programs simultaneously, and is optimized for use in applications where data loss may be likely, such as transmission of video and audio over coaxial cable television networks, fiber and satellite transponders. The Program Stream is optimized for multimedia applications, for performing systems processing in software, and for MPEG-1 compatibility. It is suitable for use in error-free environments such as when the compressed data are stored on a disk. Transport Stream and Program Stream are built on a common Packetized Elementary Stream (PES) packet structure, facilitating common video and audio decoder implementations and stream type conversions.

The Elementary Stream (ES) is a generic term for one of the coded video, coded audio or other coded bit streams in PES packets. The video elementary stream defines how compressed video data signals are to be decoded by using different variable length coding (VLC) tables, inverse scanned, inverse quantized, inverse discrete cosine transformed (IDCT) and motion compensated, and to be presented in the right order of pictures. The elementary stream layer contains the coded picture data. The basic structure for the coded picture data is a macroblock which comprises a 16 pixel by 16 pixel array. Macro blocks are the basis for motion compensation and variable length coding, while a macro block is further divided into four equal-sized 8 pixel by 8 pixel arrays of samples called blocks for zig-zag scanning and DCT transformation. Multiple macroblocks form a slice. A coded picture consists of one or multiple slices. Multiple coded pictures form a group of pictures. One or more groups of pictures form a sequence. Such hierarchical layering of data structures allows processing according to one embodiment of the present invention to occur on various layers. In one embodiment, output and analysis of compressed and raw video data is segmented on macroblock level.

The video access unit level information relates to a coded picture and may specify whether the picture is an intra frame (I frame) containing full picture information, a predicted frame (P frame) which is constructed using a past I or P frame, or a bi-directionally predicted frame (B frame) which is bi-directionally compensated using past or future I or P frames.

The structure of an MPEG bit stream is well-known to one of skill in the art and is described by the MPEG standards. The present invention is suitable for use with the MPEG-1 specification, described in ISO/IEC International Standard 11172; "Coding of moving pictures and associated audio for digital storage media up to about 1.5 Mbits/s", November 1993, which is herein incorporated by reference. The present invention is also suitable for use with the MPEG-2 specification, described in ISO/IEC International Standard 13818; "Generic coding of moving pictures and associated audio information", November 1994, which is herein incorporated by reference.

FIG. 1 illustrates a video data analysis tool 300 in accordance with a specific embodiment of this invention. The analysis tool 300 includes an output video window 301. Within the output video window 301, a video image 302 is displayed. The video image 302 provides the user with a visual frame of reference, e.g., for viewing compressed video data information. The image 302 includes viewable output video data, such as raw video data or decompressed video data encountered after encoding and decoding according to an MPEG standard. As shown, image 302 comprises a single frame from a movie. Because the measurement tool 300 typically outputs a video image after full decompression, statistical data and other information gained during compression or transcoding may not be readily apparent from the video image 302. The analysis tool 300 is well suited for manipulating the display within window 301 as well as analyzing information related to encoding, transcoding, and/or decoding the video data in video image 302. It is contemplated that the encoding, transcoding, and/or decoding may also comprise partial encoding, transcoding, and/or decoding.

In the illustrated embodiment, analysis tool 300 includes a control panel 304. The control panel 304 includes a plurality of user interface control components for facilitating analysis of information in the image measurement window 301. To facilitate discussion, the user interface control components may be grouped into functional sections within the control panel 304. As illustrated, the control panel 304 includes a display function section 306, a data information section 307, a compressed data function section 308, a frame information section 309. Other arrangements, with or without a "control panel" are also contemplated.

Figure 2A:
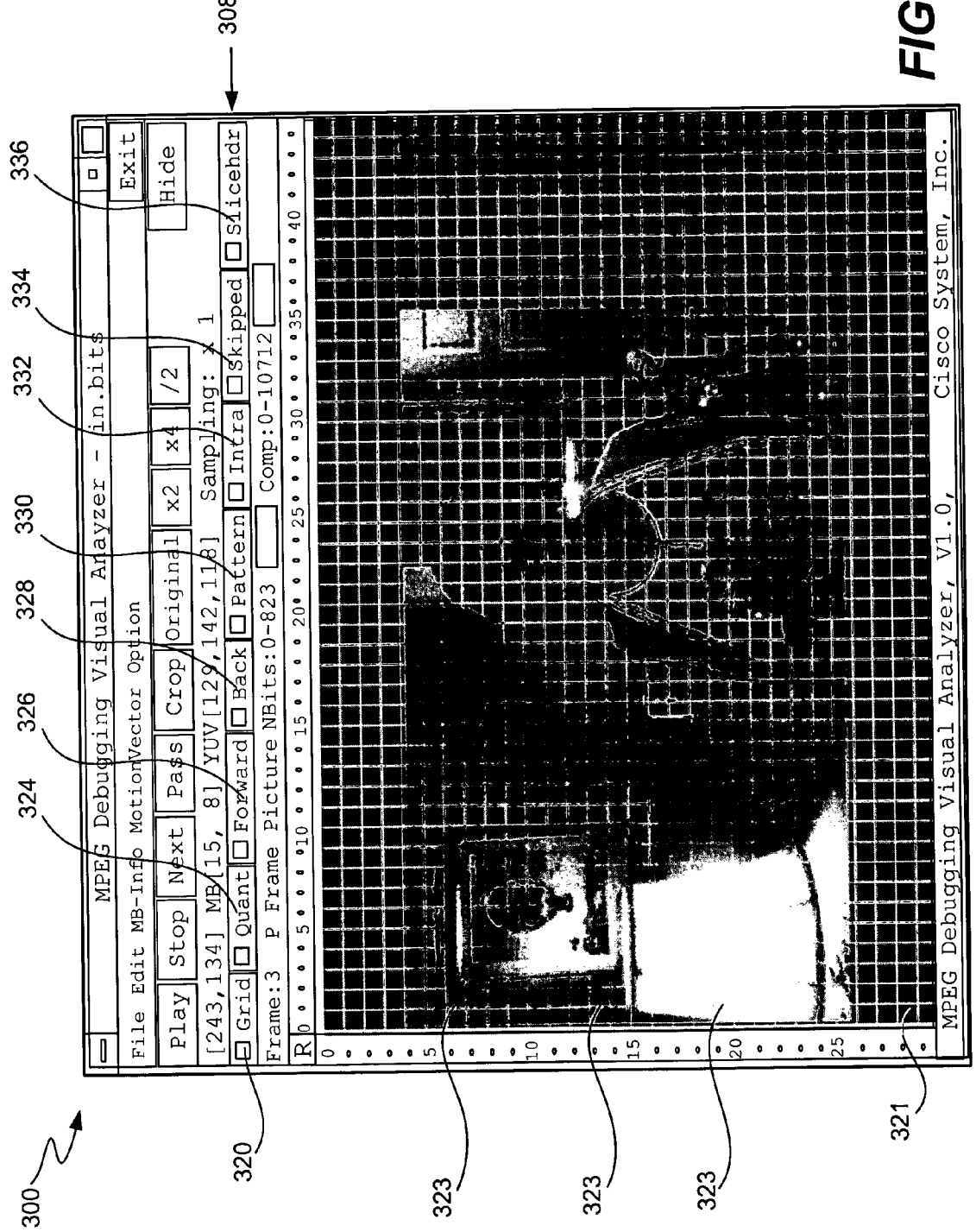
FIG. 2A illustrates the analysis tool of FIG. 1 with a grid tool turned on to define an array of segments.

The compressed data function section 308 comprises display controls for allowing the user to manipulate the presentation of compressed data. As shown in FIG. 2A, compressed data function section 308 includes a grid tool 320, quantization tool 324, forward tool 326, backward tool 328, pattern tool 330, intra tool 332, skipped tool 334, and slice header tool 336.

Grid tool 320 allows the user to display a segmentation of video image 302 according to a particular compression structure. As mentioned, compressed data may be organized or structured according to various levels of compression. For MPEG compression, this includes organization according to blocks or macroblocks. As shown in FIG. 2A, grid tool 320 is a simple toggle that turns on and off grid 321. Grid 321 defines an array of segments 323. In this case, grid tool 320 segments video image 302 into macroblock segments 323 and visually displays the boundaries of each macroblock in image 302. Analysis of compressed data may then be performed or visually presented within one or more macroblock segments 323.

Figure 2B:
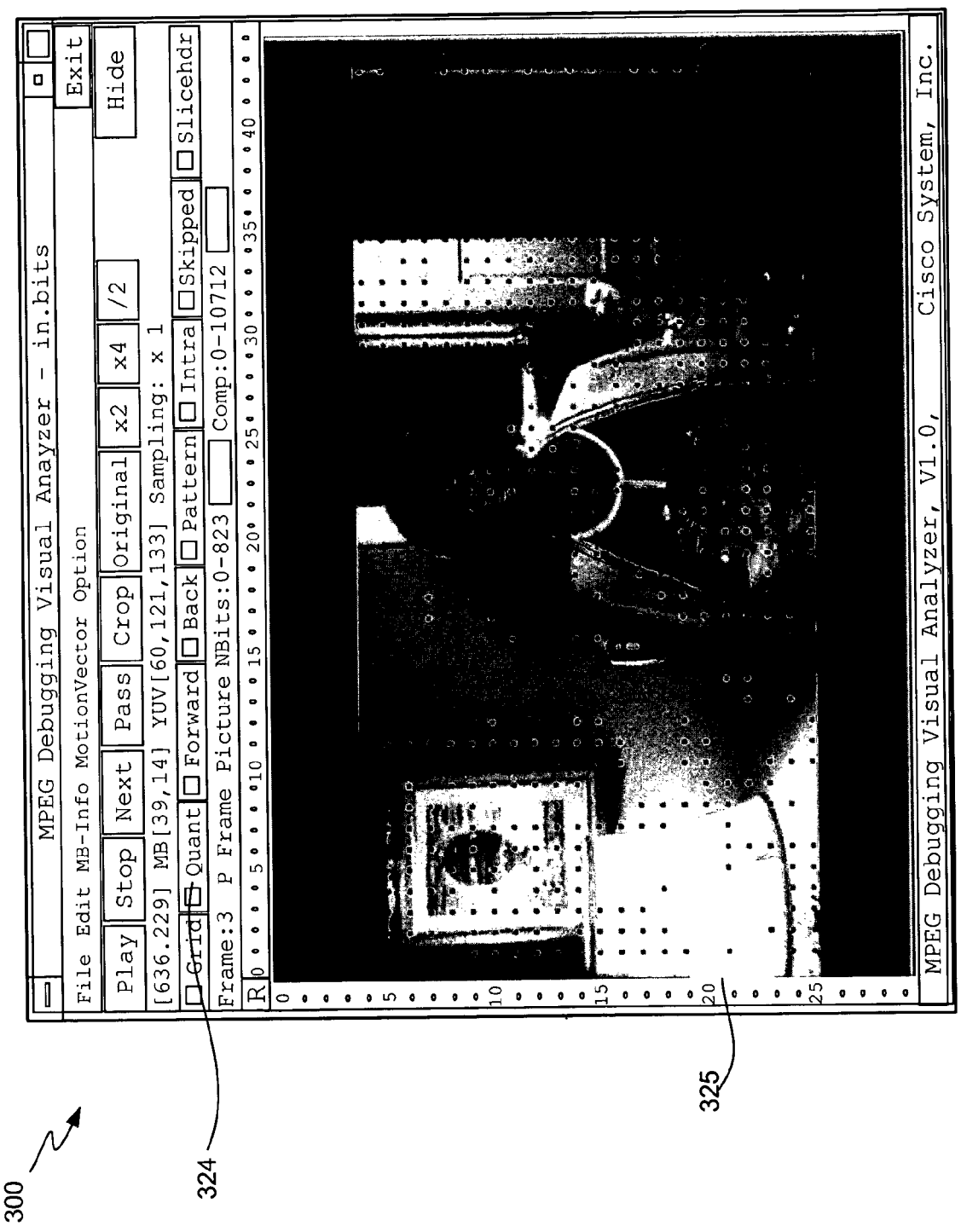
FIG. 2B illustrates the analysis tool of FIG. 1 with a quantization tool turned on in to display whether a new value of quantization is included in a segment.

For analysis tool 300, the remaining display controls in compressed data function section 308 permit a user to display whether a particular compression feature is included in a segment of image 302. Quantization tool 324 permits a user to display whether a new value of quantization is used in a macroblock 323 within video image 302. In a specific embodiment, quantization tool 324 is a toggle, which when turned on, displays a blue block indicator 325 in each macroblock 323 of video image 302 that has a new quantization value in the slice that the macroblock belongs to. FIG. 2B illustrates image 302 with quantization tool 324 turned on and grid tool 320 turned off.

Figure 2C:
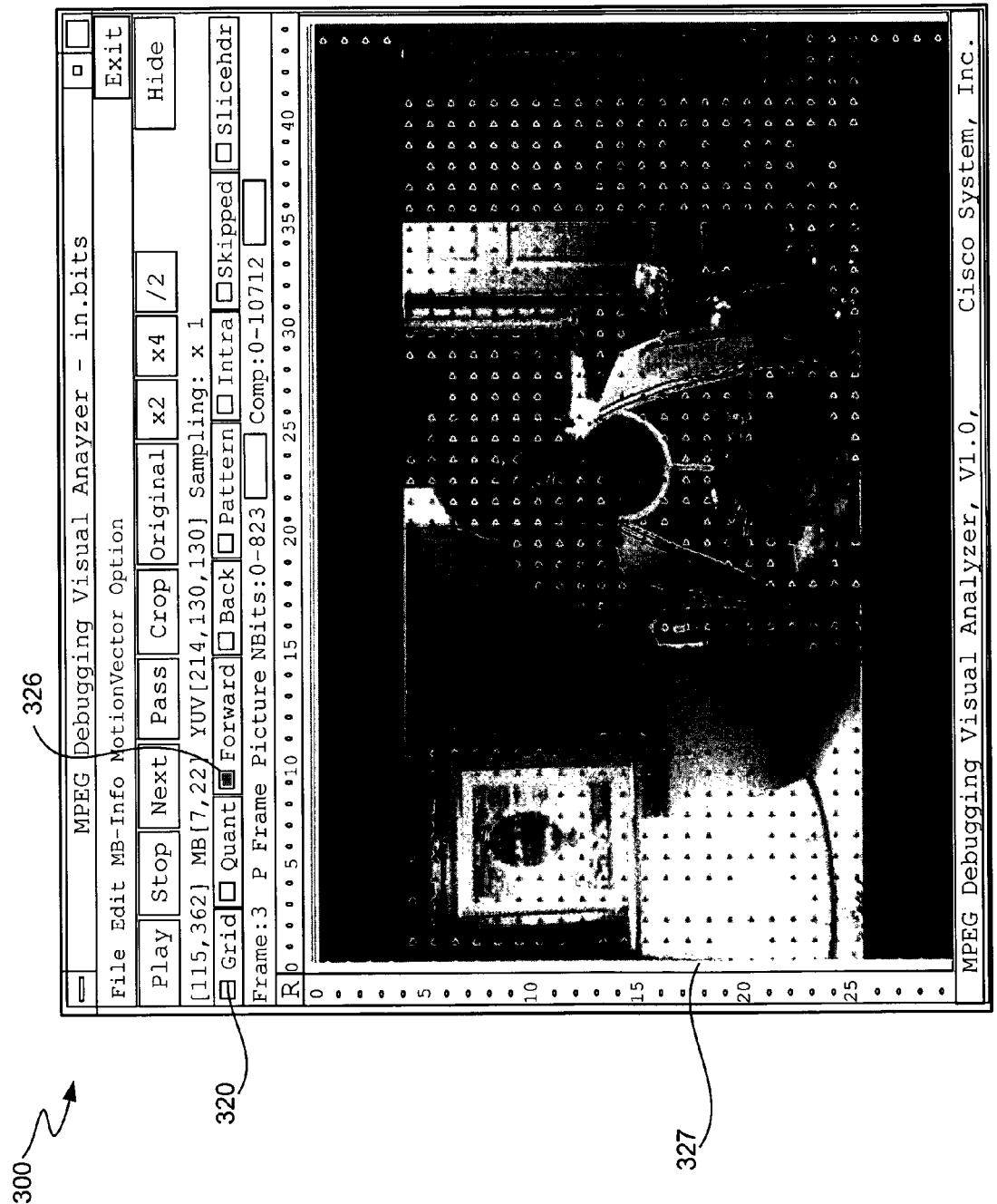
FIG. 2C illustrates the analysis tool of FIG. 1 with a forward motion vector tool turned on in to display whether a forward motion vector is included in a segment.
Figure 2D:
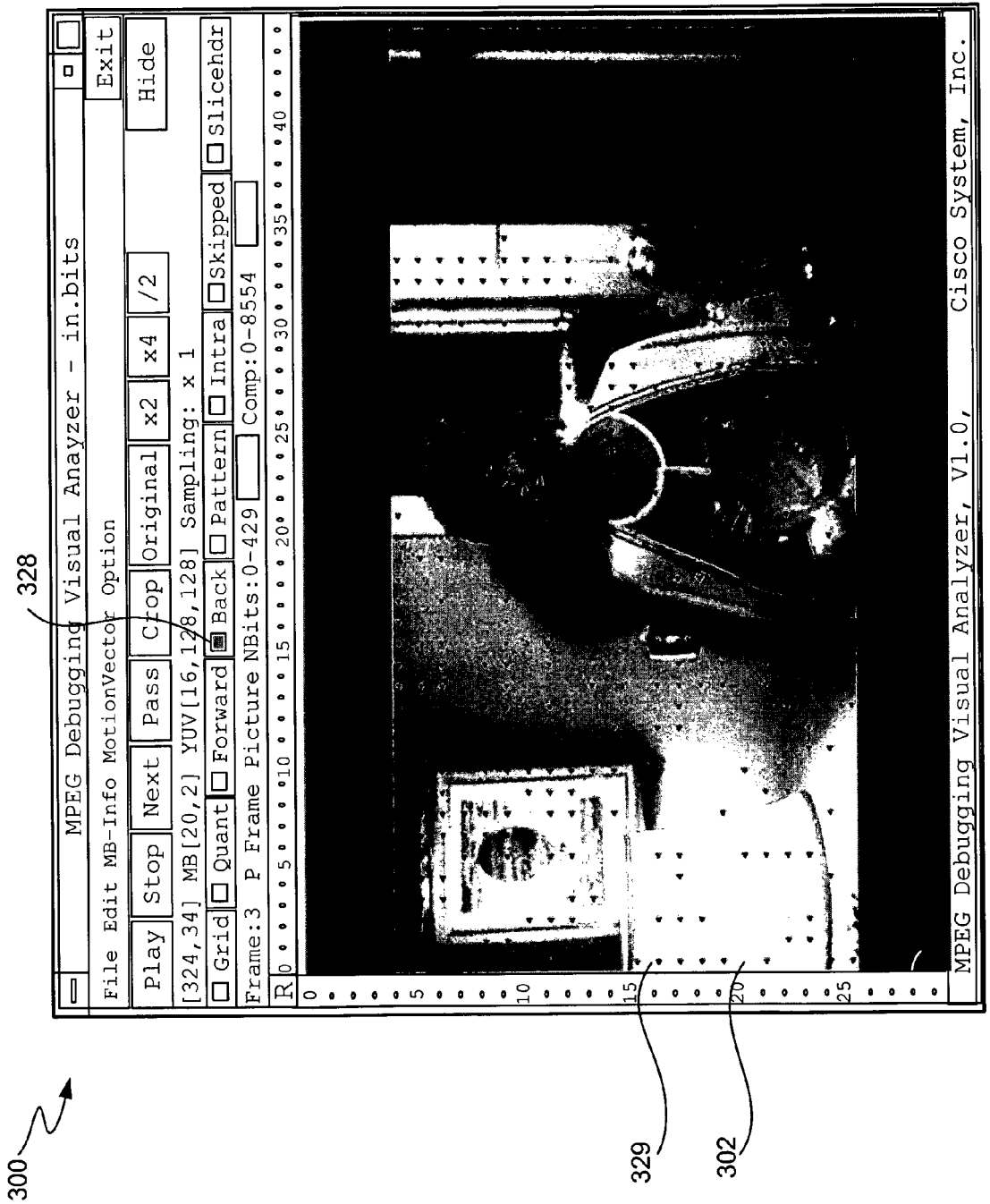
FIG. 2D illustrates the analysis tool of FIG. 1 with a backward motion vector tool turned on in to display whether a backward motion vector is included in a segment.
Figure 2E:
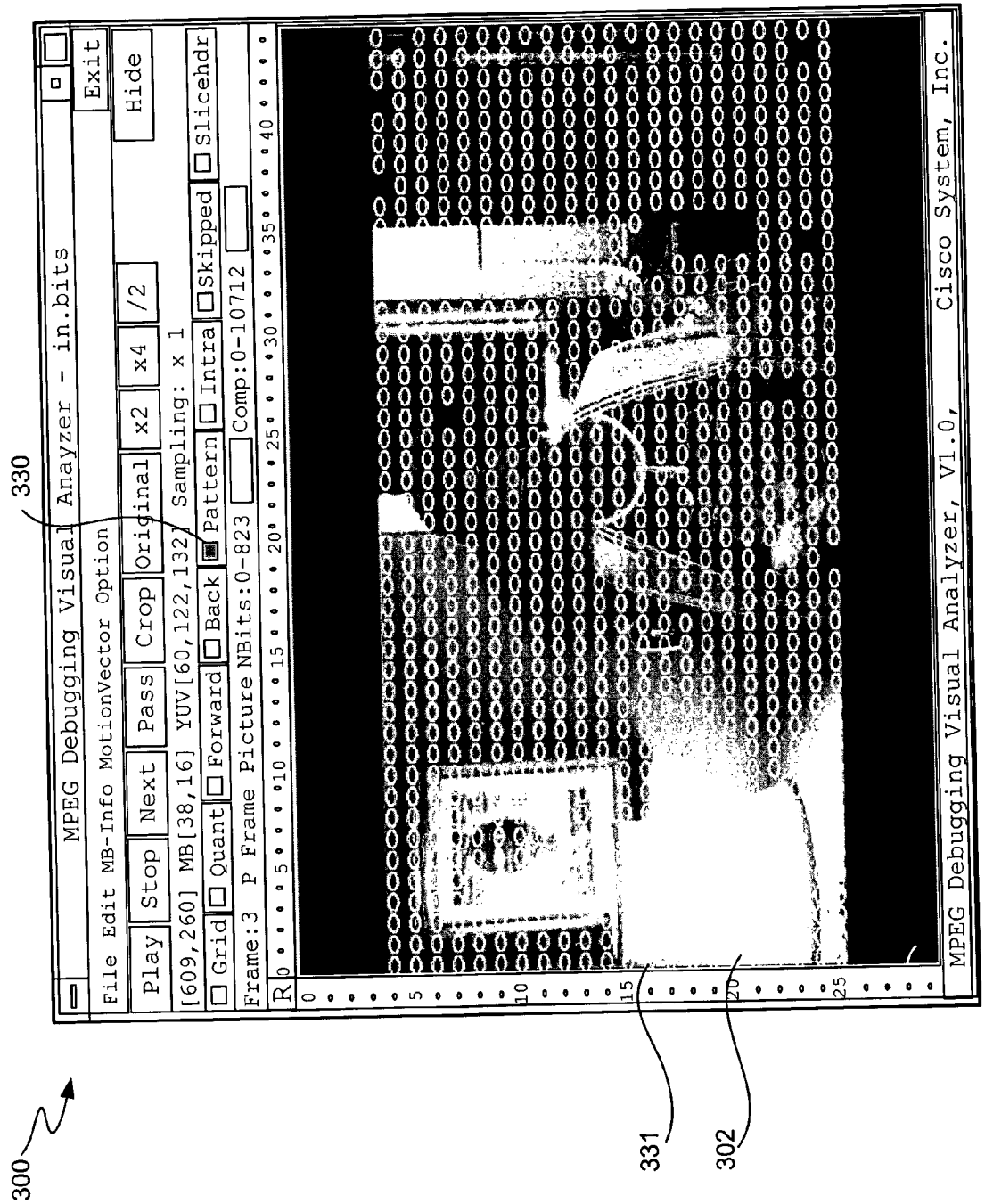
FIG. 2E illustrates the analysis tool of FIG. 1 with a pattern tool turned on in to display whether there are non-zero DCT blocks included in a segment.
Figure 2F:
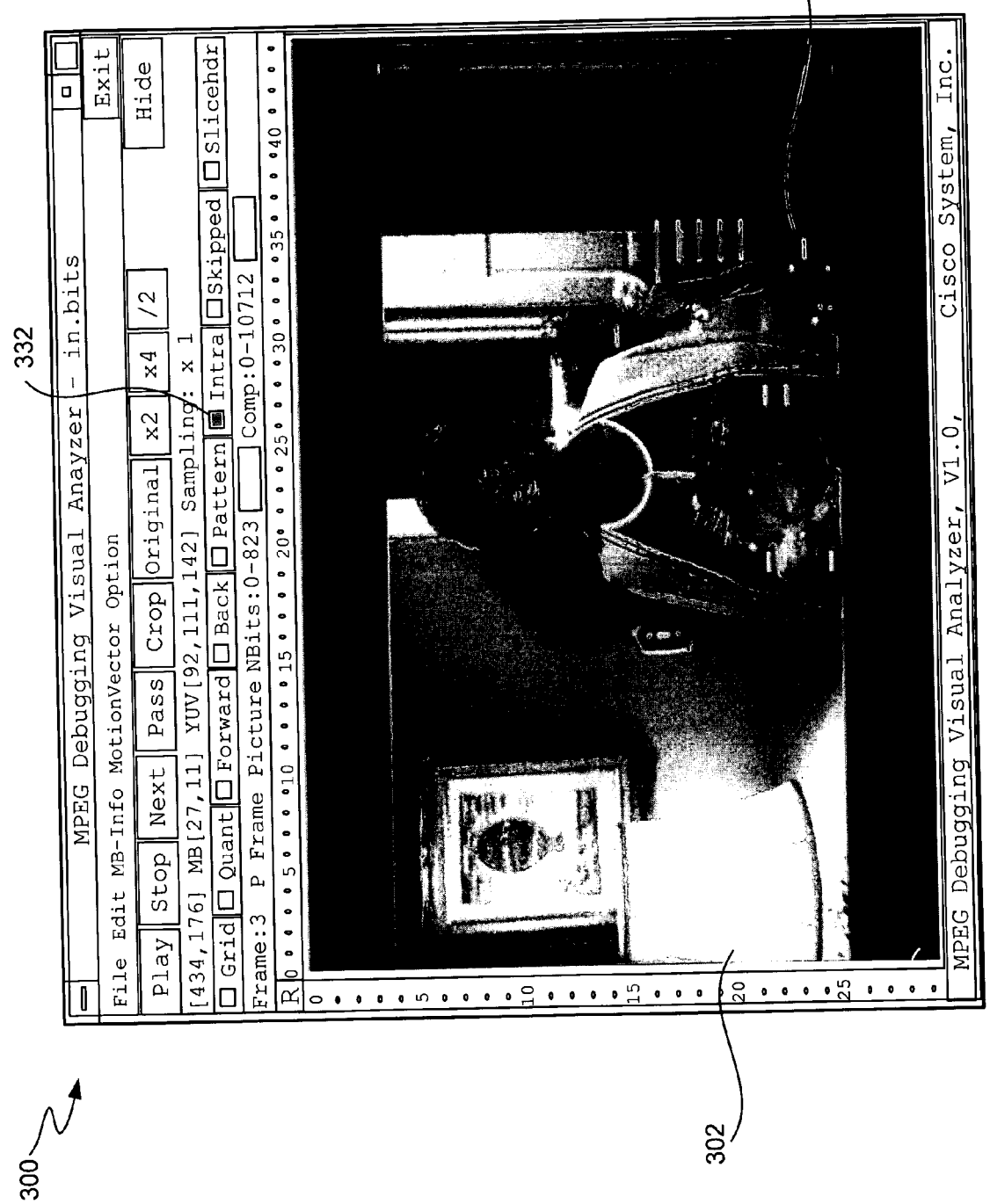
FIG. 2F illustrates the analysis tool of FIG. 1 with a display tool turned on in to display whether full video information is included in a segment.
Figure 2G:
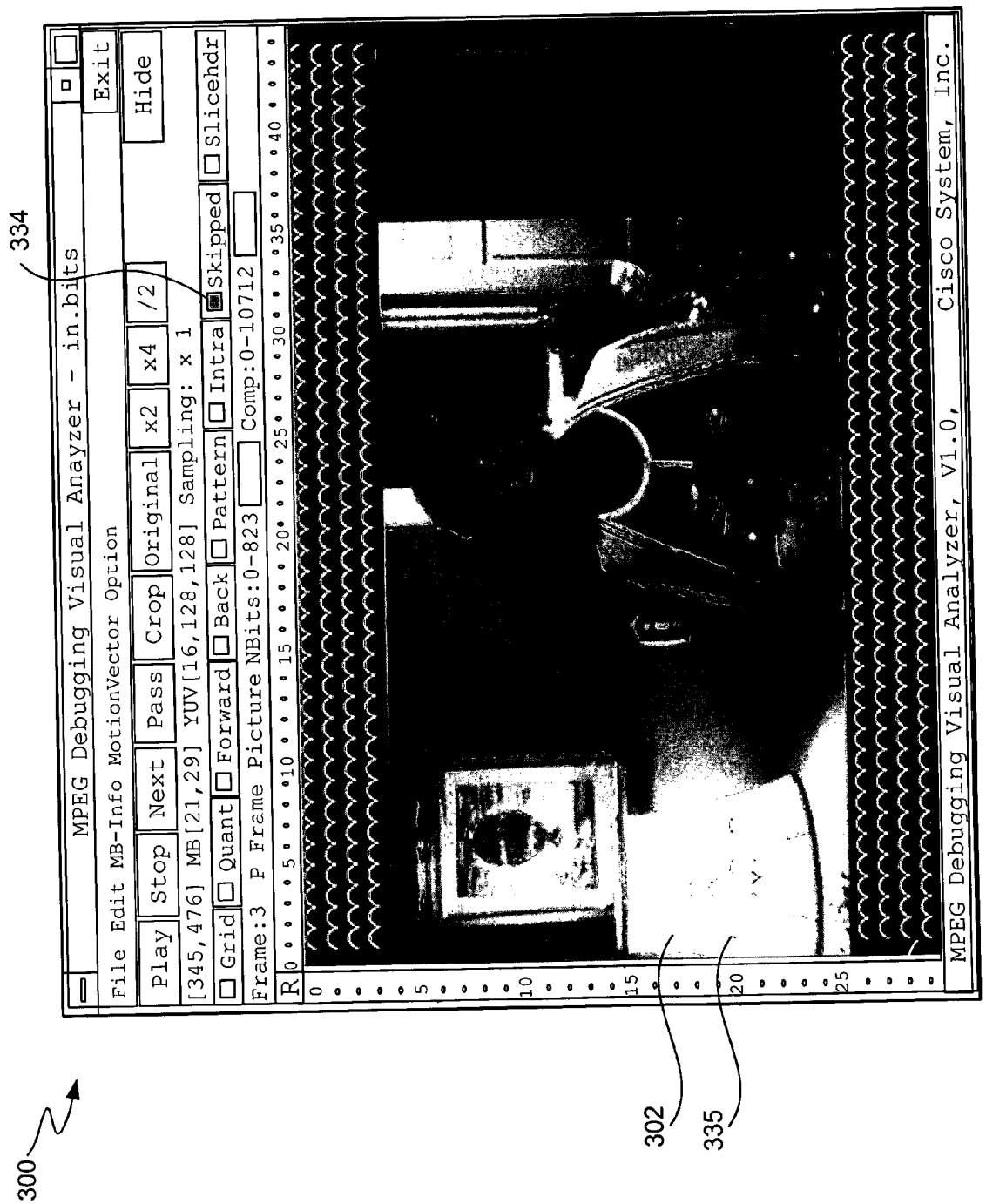
FIG. 2G illustrates the analysis tool of FIG. 1 with a display tool turned on in to display whether information included in a segment is encoded.
Figure 2H:
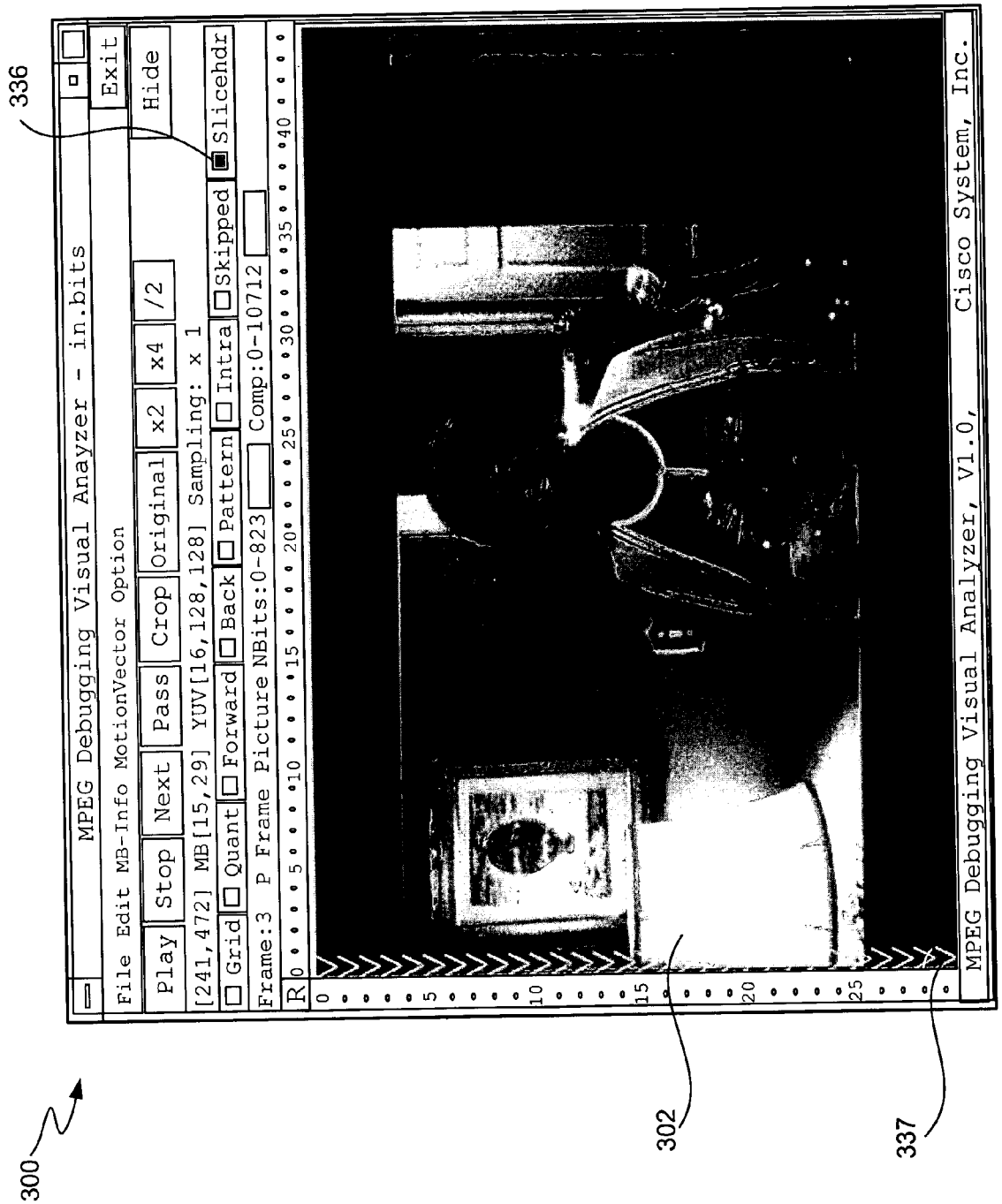
FIG. 2H illustrates the analysis tool of FIG. 1 with a slice header tool turned on in to display the location of slice headers.
Figure 2I:
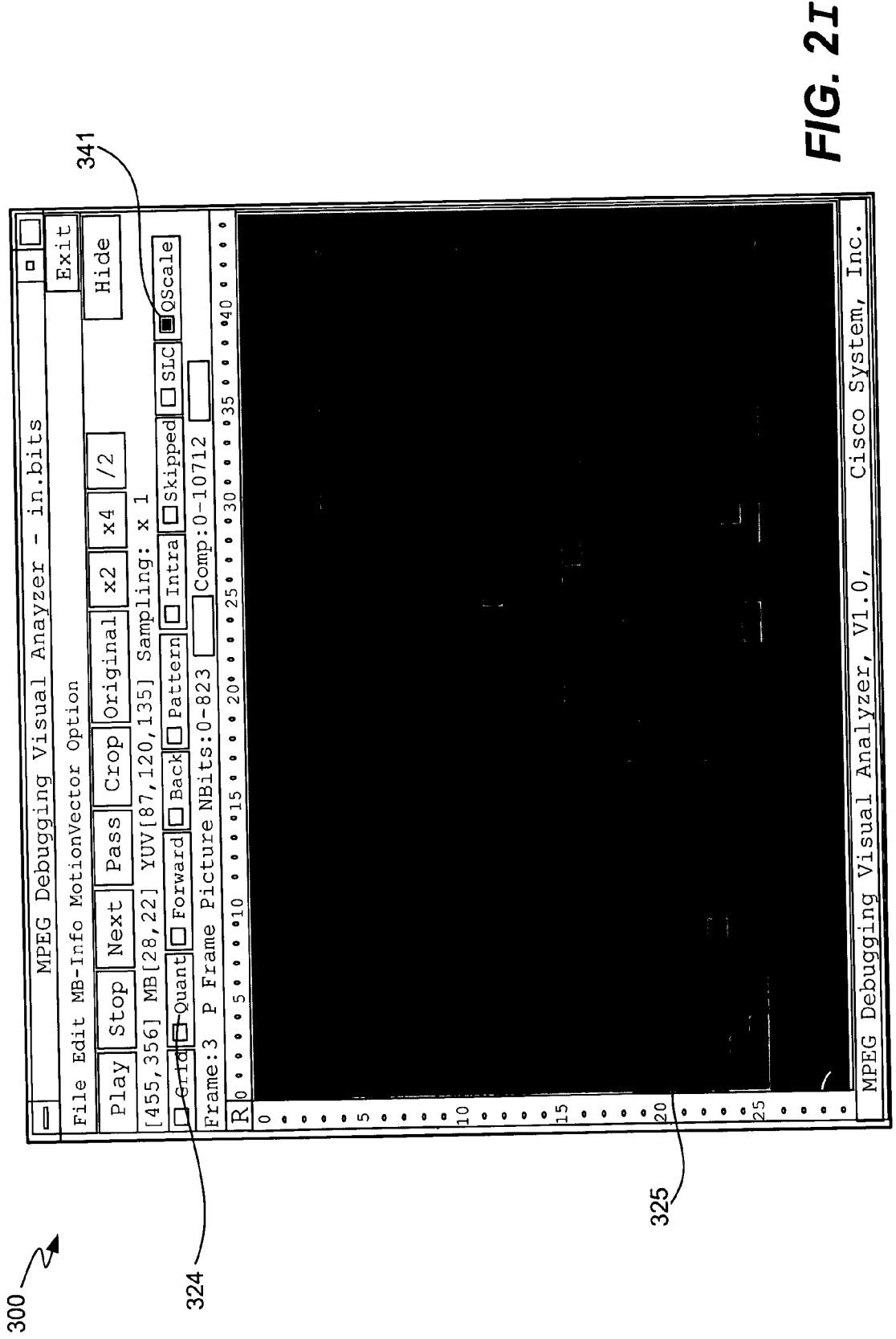
FIG. 2I illustrates the analysis tool of FIG. 1 with a quantization scale tool turned on to display the quantization scale value in each segment.

In another embodiment, a quantization scale value tool 341 may be added as shown in FIG. 2I to provide a numerical indication for the quantization value of each macroblock 323 by visually displaying quantization scale values using different brightness for each macroblock 323 in gray. That is, a brighter MB represents a larger quantization scale value (coarse quantization) and a darker MB represents a smaller value (fine quantization). This gives a user the perception of the quantization scale value distribution on a picture. A button "QScale" 341 in FIG. 2I allows the user to toggle this feature. As shown, when the quantization scale value graph is displayed, the original picture is put into background.

Forward tool 326 permits a user to display whether a forward motion vector is included in a macroblock segment 323. In a specific embodiment, forward tool 326 is a toggle, which when turned on, displays a right green arrow indicator 327 within each macroblock 323 in video image 302 that has a forward motion vector. FIG. 2C illustrates image 302 with forward tool 326 turned on and grid tool 320 turned off.

Backward tool 328 permits a user to display whether a backward motion vector is included in a macroblock segment 323. In a specific embodiment, backward tool 328 is a toggle, which when turned on, displays a left red arrow indicator 329 within each macroblock 323 in video image 302 that has a backward motion vector. FIG. 2D illustrates image 302 with backward tool 328 turned on.

Pattern tool 330 permits a user to display whether there are non-zero DCT blocks for each of the macroblocks 323 within video image 302. In a specific embodiment, pattern tool 330 is a toggle, which when turned on, displays a yellow oval indicator 331 within each macroblock 323 in video image 302 that has a non-zero DCT block. FIG. 2E illustrates image 302 with pattern tool 330 turned on.

Intra tool 332 allows a user to display whether each macroblock 323 within video image 302 contains full video information. Full video information refers to the independence of a macroblock to another macroblock or video frame. For example, if video image 302 is an I frame, then all macroblocks 323 will contain full picture information and not require referencing motion vectors to other macroblock(s) or frame (s). In a specific embodiment, intra tool 332 is a toggle, which when turned on, displays a horizontal orchid bar indicator 333 within each macroblock 323 in video image 302 that has full video information. FIG. 2F illustrates image 302 with intra tool 332 turned on.

Skipped tool 334 allows a user to display whether data for each of the macroblocks 323 within video image 302 is encoded. In other words, skipped tool 334 may tell a user whether a specific macroblock includes video data that was compressed. Further description of whether video data for a macroblock has been encoded is provided in the MPEG specification, which was incorporated by reference above. In a specific embodiment, skipped tool 334 is a toggle, which when turned on, displays a salmon arch indicator 335 within each macroblock 323 in video image 302 that has no encoded video data. FIG. 2G illustrates image 302 with skipped tool 334 turned on.

Slice header tool 336 allows a user to display the location of slice headers for image 302. As mentioned above, multiple macroblocks form a slice. A slice header indicates the beginning of a slice. In a specific embodiment, slice header tool 336 is a toggle, which when turned on, places a downward arrow indicator 337 before the macroblock 323 that corresponds to the beginning of a slice. FIG. 2H illustrates image 302 with slice header tool 336 turned on.

Figure 3:
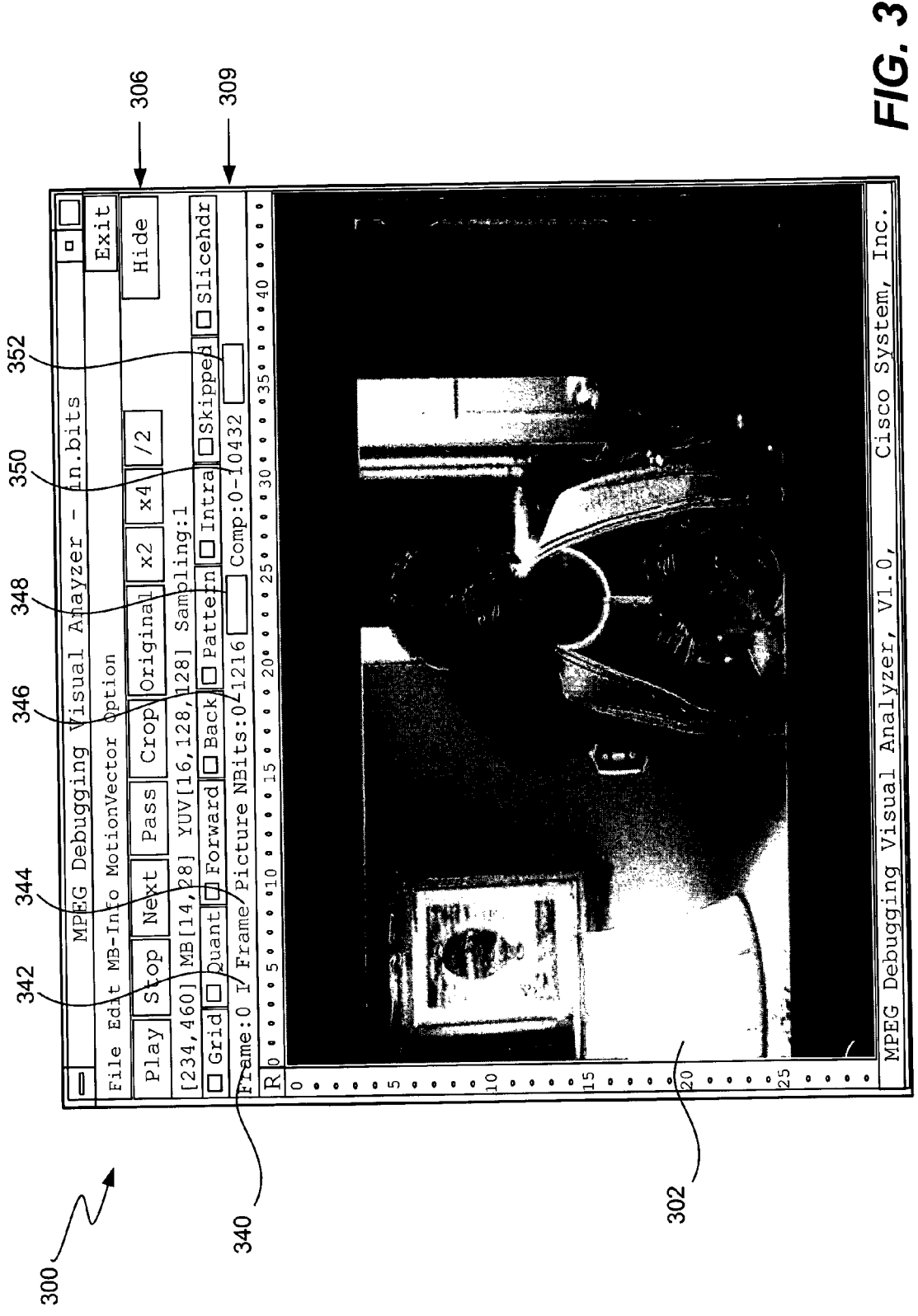
FIG. 3 illustrates the analysis tool of FIG. 1 showing compression and frame information regarding the current frame displayed in the window.

Referring to FIG. 3, frame information section 309 provides the user with compression and frame information regarding the current frame displayed in window 301. Frame information section 309 includes a frame number 340, frame indicator 342, frame/field 344 indicator, number of bits of macroblocks (Nbits) field 346, number of bits histogram 348, complexity range of macroblocks 350, and complexity histogram 352.

Frame number 340 displays the numerical position of image 302 with respect to the image sequence's first frame. Frame number zero (0) indicates that the displaying image is the first frame of the sequence. Frame indicator 342 indicates the image picture type for image 302 in window 301. Frame indicator 342 specifies whether image 302 is an I frame, a P frame, or a B frame. Picture structure indicator 344 describes the picture's structure type of image 302, as a frame picture, top-field picture or bottom-field picture, as defined by the MPEG specification.

Nbits field 346 provides the user with a range of the number of bits used in compression by the macroblocks 323 of image 302. More specifically, since each macroblock 323 has a number of bits associated with compression of the video data contained therein, Nbits field 346 field allows a user to determine the diversity of compression complexity for macroblocks 323 within frame 302. As shown, '0' represents the lower limit of the number of bits used by a macroblock 323 within image 302, which is the case for a macroblock that is skipped. Alternatively, '1216' represents the upper limit of the number of bits used by a macroblock 323 within image 302.

Histogram 348 provides a graphical distribution of the number of bits used in compression by macroblocks 323 for image 302. More specifically, number of bits histogram 348 provides a graphical representation of the diversity of compression complexity within frame 302 according to the number of bits for each macroblock 323. As shown, the horizontal axis of histogram 348 provides the range of the number of bits for macroblocks 323, while the vertical axis represents the frequency of the number of bits for macroblocks 323.

Complexity range of macroblocks 350 provides an additional indication of the compression complexity for macroblocks 323 of image 302. In a specific embodiment, complexity is defined as the product of the number of bits (Nbits) and the quantization scale value (qscale) for a macroblock. Complexity range 350 then gives an indication of the amount of encoding and decoding computation for macroblocks 323 in image 302. As shown, '0' represents the lower limit of complexity for a macroblock 323 within image 302, which is the case for a macroblock that is skipped Alternatively, '10432' represents the upper limit of complexity for a macroblock 323 within image 302.

Histogram 352 provides a graphical distribution of the complexities for macroblocks 323 of image 302. More specifically, histogram 352 provides a graphical representation of the diversity of compression complexity within frame 302. As shown, the horizontal axis of histogram 352 provides the range of complexity for macroblocks 323 (as defined above) while the vertical axis represents the frequency of occurrence for each complexity value for macroblocks 323.

Figure 4A:
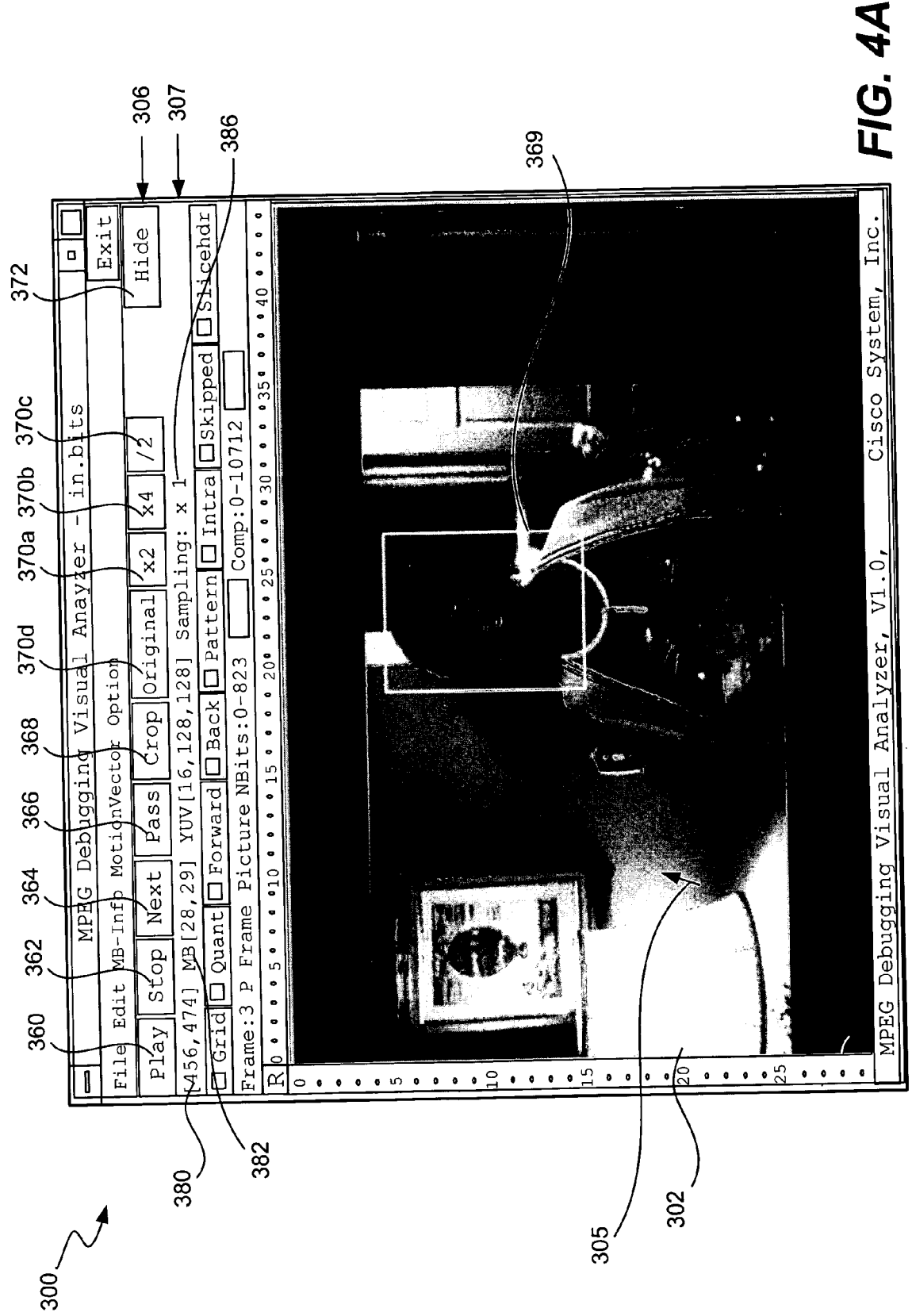
FIG. 4A illustrates a crop tool used within analysis tool of FIG. 1 to separate a portion of an image.

Referring to FIG. 4A, the display function section 306 includes display controls that allow a user to manipulate the presentation of raw video data displayed in video window 301 and/or compression information associated with the current image that is resulted from analysis, for each of the tools described with respect to analysis tool 300. Display function section 306 includes play tool 360, stop tool 362, next tool 364, pass tool 366, crop tool 368, resolution modifiers 370, and hide/display tool 372.

Play tool 360 permits the user to play decoded video one frame at a time. Alternatively, if one of the other toggles or tools is turned on such as quantization tool 324, then play tool 260 displays the output for that tool and the image sequence if the display/hide tool 372 is toggled on, one frame at a time. The frame rate depends on the computation of the decoding/encoding or other software under investigation and the display tool's performance, as one of skill in the art will appreciate. Stop tool 362 permits the user to stop the playing video or video data for analysis, at a particular image or frame.

Figure 4B:
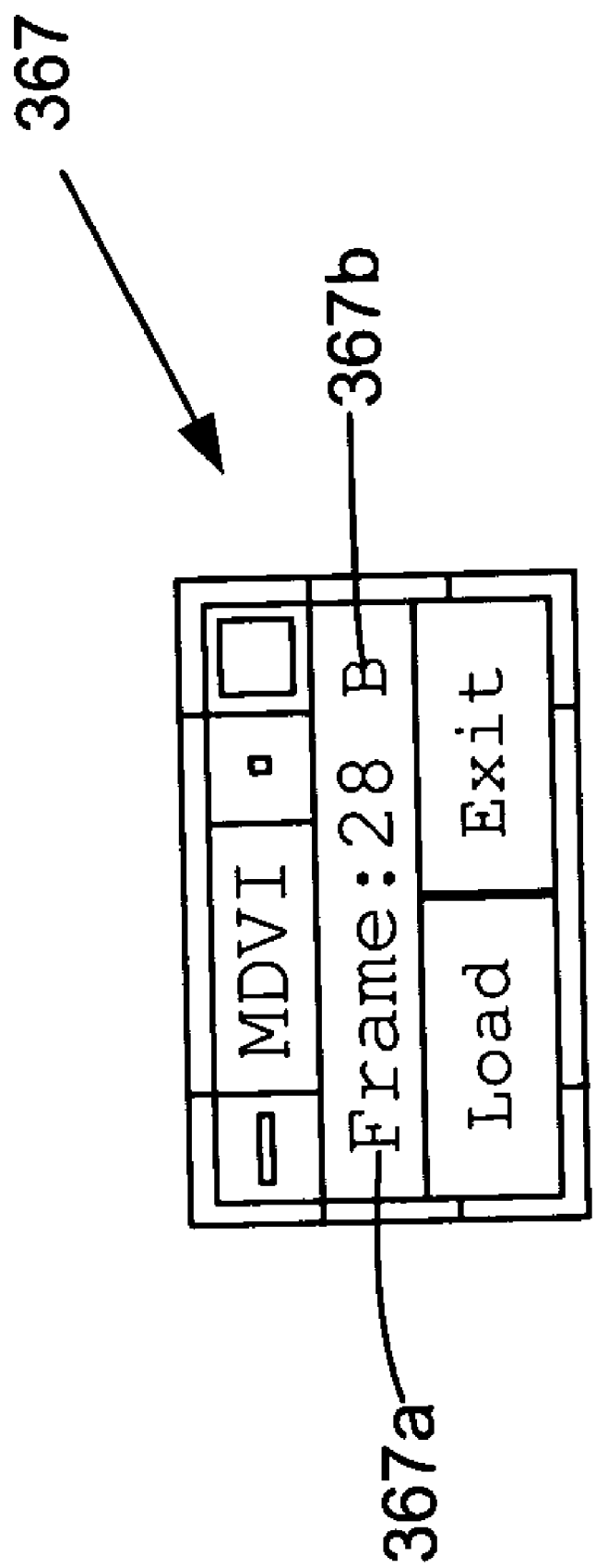
FIG. 4B illustrates a pop-up window that allows a user of the analysis tool of FIG. 1 to fast forward to a frame as desired.

Next tool 364 permits a user to advance one frame at a time through the decoded video output, and provides information for each frame for each of the tools described with respect to analysis tool 300. Pass tool 366 permits a user to fast forward through numerous frames of the decoded output video and to a specific frame. In one embodiment, toggling pass tool 366 provides a pop-up window 367 that speeds up the fast forward by hiding display contents other than the frame number 367*a* and picture type 367*b*, as illustrated in FIG. 4B. Frame number 367*a* and picture type 367*b*, as described above, provide a reference for the user to assist in the selection of which frame to fast forward to using pop-up window 367. In another embodiment where analysis tool is called from a program during execution, next tool 364 or pass tool 366 permit a user to exit execution of the analysis window 300 and release control back to a debugger running code in a program. If the program calls analysis window 300 again, analysis window 300 will update according to the information at this stage of the program.

Figure 4C:
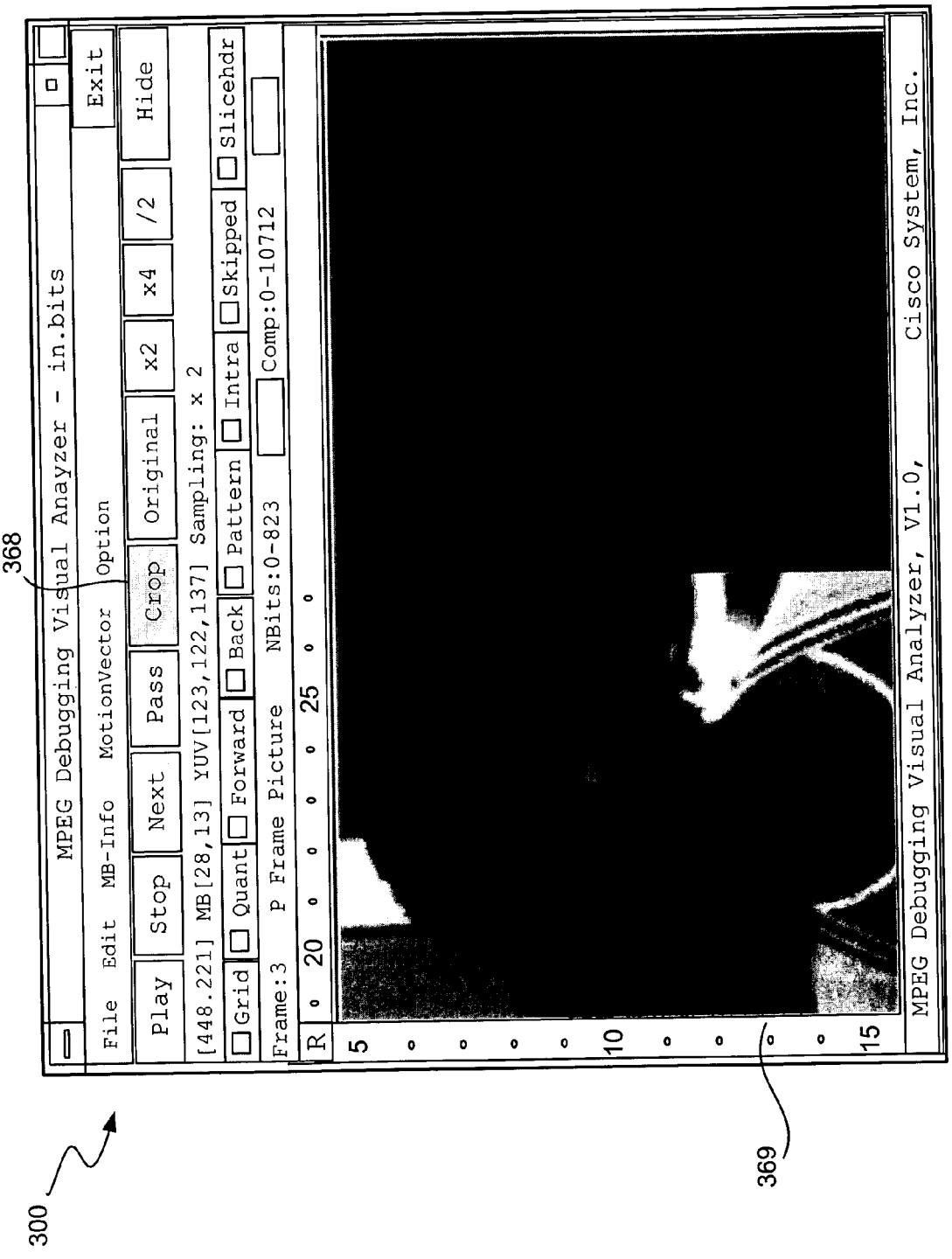
FIG. 4C illustrates a portion of an image after applying a crop tool of the analysis tool of FIG. 1.

Referring back to FIG. 4A, crop tool 368 and resolution modifiers 370 permit the user to manipulate the raw video image. Crop tool 368 allows a user to separate a portion of image 302 apart from the rest of image 302. Typically, a user selects a region 369 of image 302 to be cropped. In a specific embodiment, the user uses a mouse or similar graphical interface manipulanda to define a rectangular region to be cropped. FIG. 4C illustrates a portion 369 of image 302 after applying crop tool 368.

Referring back to FIG. 4A, resolution modifiers 370a, 370b, and 370c allow a user to modify the resolution of image 302. More specifically, resolution up conversion may be achieved using resolution modifiers 370a, 370b to allow a user to see detail in image 302. Resolution down conversion may be achieved by resolution modifier 370c, albeit at the cost of a blocky image 302. Original tool 370d returns image 302 from a crop as shown in FIG. 2G or a resolution change using resolution modifiers 370a, 370b, and 370c to the original image 302.

Figure 4D:
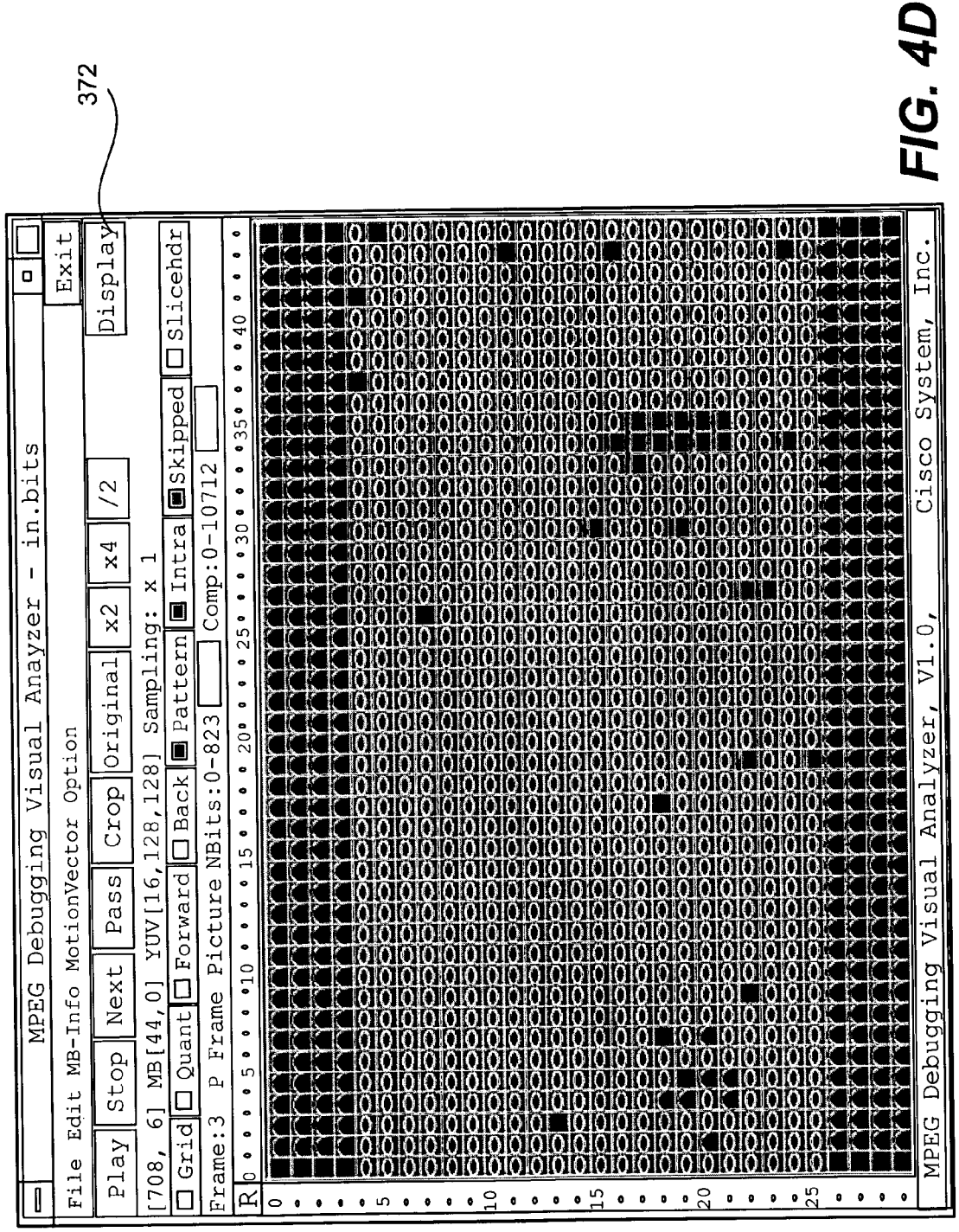
FIG. 4D illustrates the analysis tool of FIG. 1 with a hide/display tool turned on that permits a user to show information in an image window with or without the raw video data.

Hide/display tool 372 allows a user to show information in window 321 with or without the raw image 302. This may be helpful for example, to view any of the tools in the compressed data function section 308 without interference from image 302. For example, FIG. 4D illustrates window 321 with grid 320, pattern 330, intra 332, and skipped 334 all turned on and image 302 hidden using hide tool 372.

Referring back to FIG. 4A, data information section 307 provides the user with information regarding the raw video compressed data displayed in video window 301. Data information section 307 includes a pointer location 380, a macroblock identifier 382, color values 384, and sampling rate indicator 386. Each of the items in the data information section 307 relates to the pixel, macroblock and image under the cursor, and are updated automatically in real time as the cursor is moved across image 302.

Pointer location 380 displays horizontal and vertical coordinates for the current pixel position of cursor 305 within image 302. Cursor 305 is controlled by a user with a mouse, pointer, or similar computer input device and allows the user to select display tools within analysis tool 300. Macroblock identifier 382 displays the current macroblock location of the cursor 305 within image 302. Color space indicator 384 provides the YUV color space parameters of the current pixel at the location of the cursor 305 within image 302. Sampling rate indicator 386 provides the sampling rate of the current image 302 with respect to the originally image 302. This value can be any number of two's power, such as 2 as shown in FIG. 4C when the cropped image segment is up-sampled by a factor of 2 by pressing the resolution modifier "×2" 370a once.

Figure 5A:
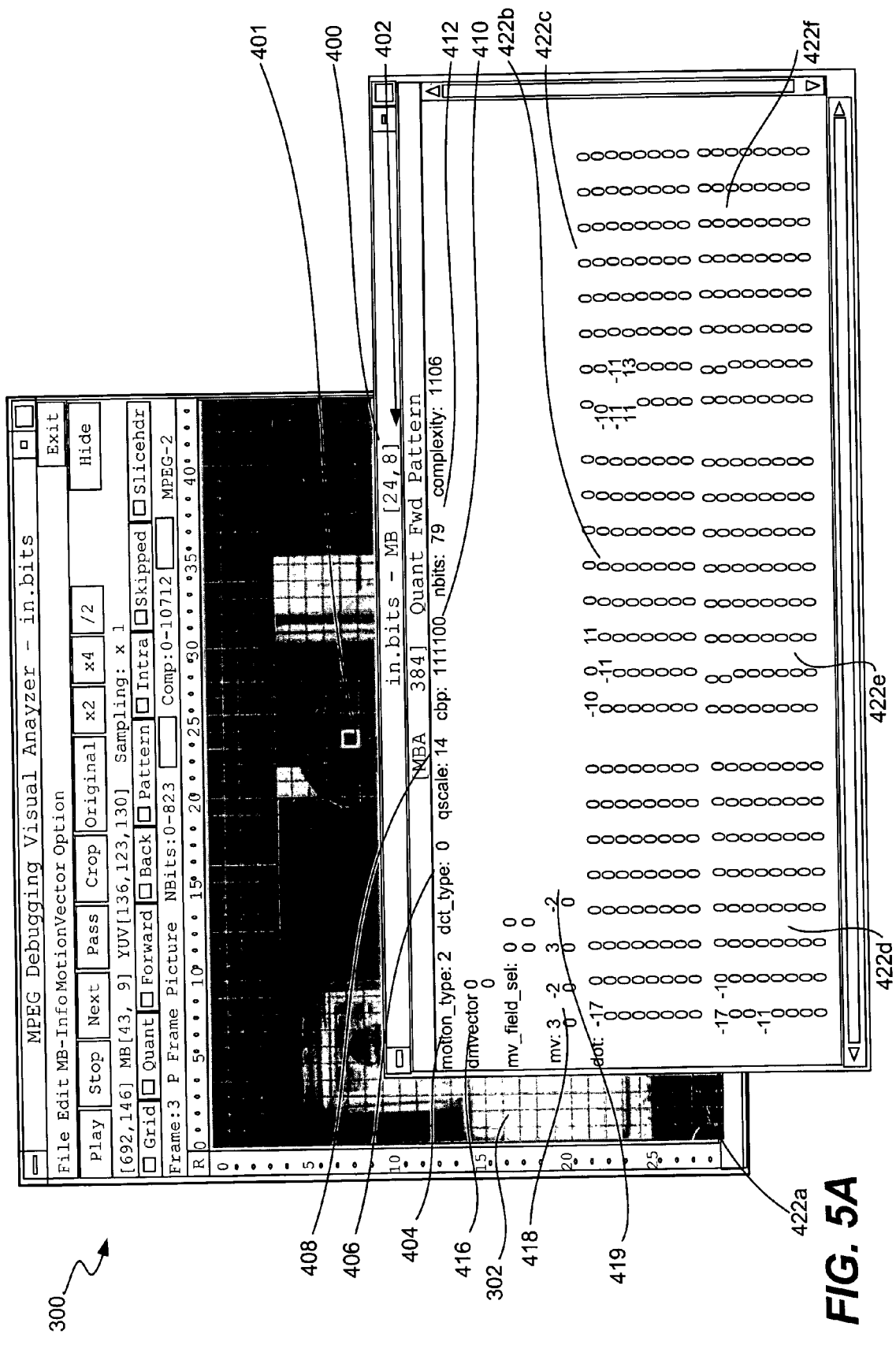
FIG. 5A illustrates a pop-up window that is initiated when a user selects macroblock within an image included in the analysis tool of FIG. 1.

To assist a user in readily obtaining information with respect to a particular macroblock, the present invention may also implement a macroblock information window. Analysis tool 300 also permits a user to obtain compressed video data information for macroblocks by, for example, right-clicking on any macroblock 323 within image 302. FIG. 5A illustrates pop-up window 400 that is initiated when a user selects macroblock 401 within image 302. The macroblock information window 400 allows the user to quickly see compressed video data information for any macroblock within image 302.

As shown, macroblock information window 400 includes compressed video data information specific to a particular macroblock 401 within image 302. Window header 402 displays the name of the image 302 from analysis tool 300 that the macroblock of pop-up window 400 pertains to. In addition, window header 402 also displays the location of the current macroblock, macroblock 401.

A motion type field 404 displays the motion prediction type as defined by the MPEG specification for macroblock 401, e.g., whether the motion is of a frame motion type or a field motion type. A DCT-type field 406 describes the discrete cosine transform type as defined by the MPEG specification for the current macroblock, e.g., whether the macroblock is frame dct coded or field dct coded. Qscale 408 provides the quantization scale value for the current macroblock.

Coded block pattern 410 provides a quick indication for a user of whether there are non-zeroe DCT coefficients in each of the coded blocks 422a-f. As shown, only the first four coded blocks 422a, 422b, 422c and 422d include non-zeroe coefficients. Nbits field 412 displays the number of bits used for encoding macroblock 401 and thus gives the user an indication of the bit allocation for the current macroblock. Complexity field 414 displays a measure of the decoding complexity of the current macroblock. As described above, one suitable basis for the complexity is the product of the number of bits (Nbits field 412) and the quantization scale value (qscale 408) for a macroblock.

dmvector 416 displays the differential motion vectors for the current macroblock, as is used for dual prime motion vector prediction. mv_field_select 417 indicates which reference field (top or bottom) is used to form the prediction.

Motion vector field 418 displays the relative location of the forward referencing macroblock used to construct the current macroblock, if one is used. Similarly, motion vector field 419 displays the relative location of the backward referencing macroblock used to construct the current macroblock, again, if one is used.

The first four coded blocks 422a-d provide DCT values for the luma values of each of the four blocks used within the current macroblock. The last two coded blocks 422e and 422f provide DCT values for the chroma Cb and Cr values of the current macroblock. This illustrates the case for an image using 4:2:0 chrominance format.

Figure 5B:
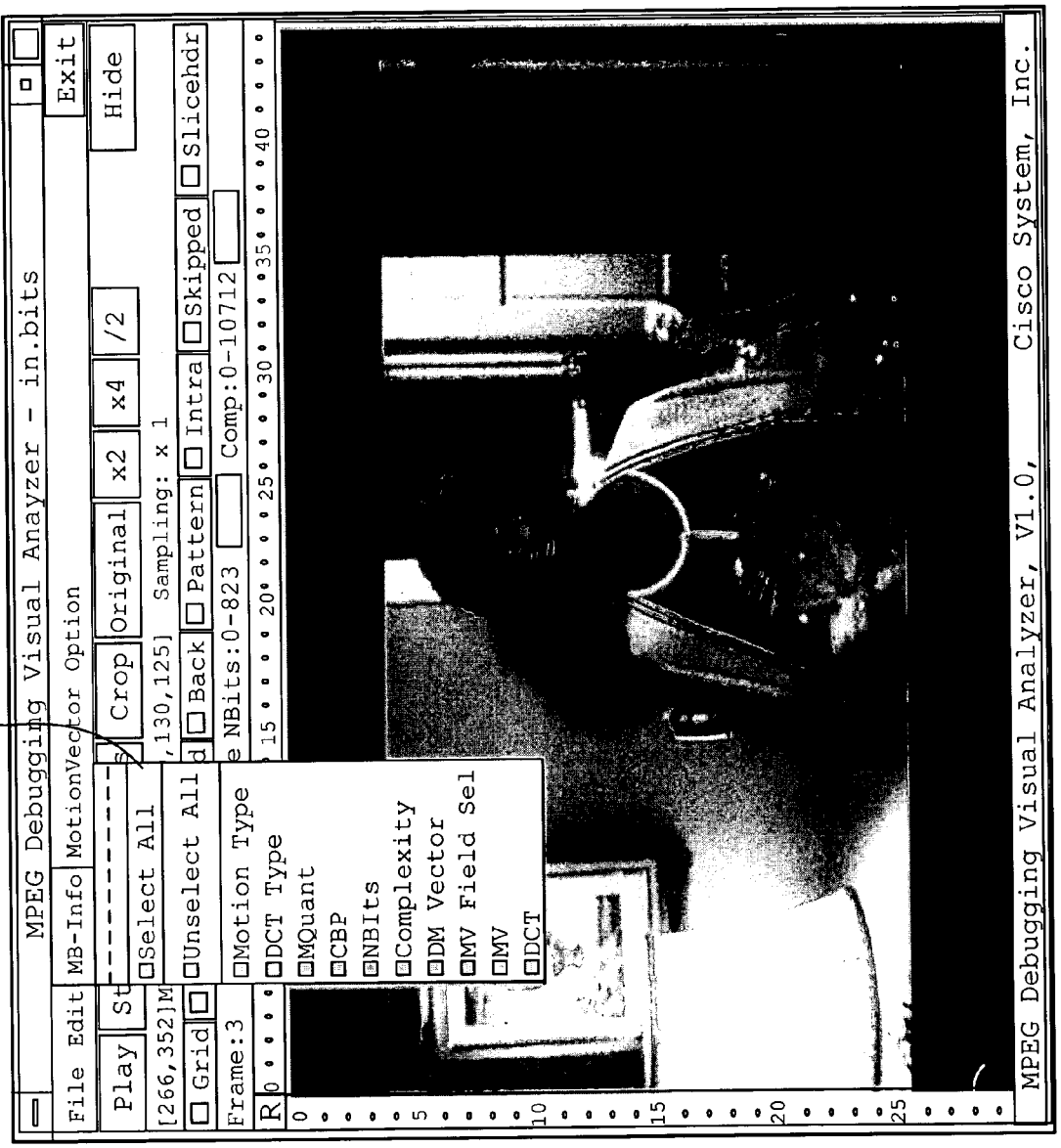
FIG. 5B illustrates a macroblock information pop-up menu that permits a user to select what information is displayed when the pop-up window of FIG. 5A is called.

To facilitate selection of which fields 402-422 are illustrated in window 400, analysis tool 300 of FIG. 1 also includes a macroblock information pop-up menu 430, as shown in FIG. 5B. Pop-up menu 430 permits the user to select each of the fields described above with respect to pop-up window 400. As shown in FIG. 4B, a user may also readily select information for all of the fields in pop-up window 400 to be displayed (as shown in FIG. 5A), or may individually select one or more of the fields.

Figure 5C:
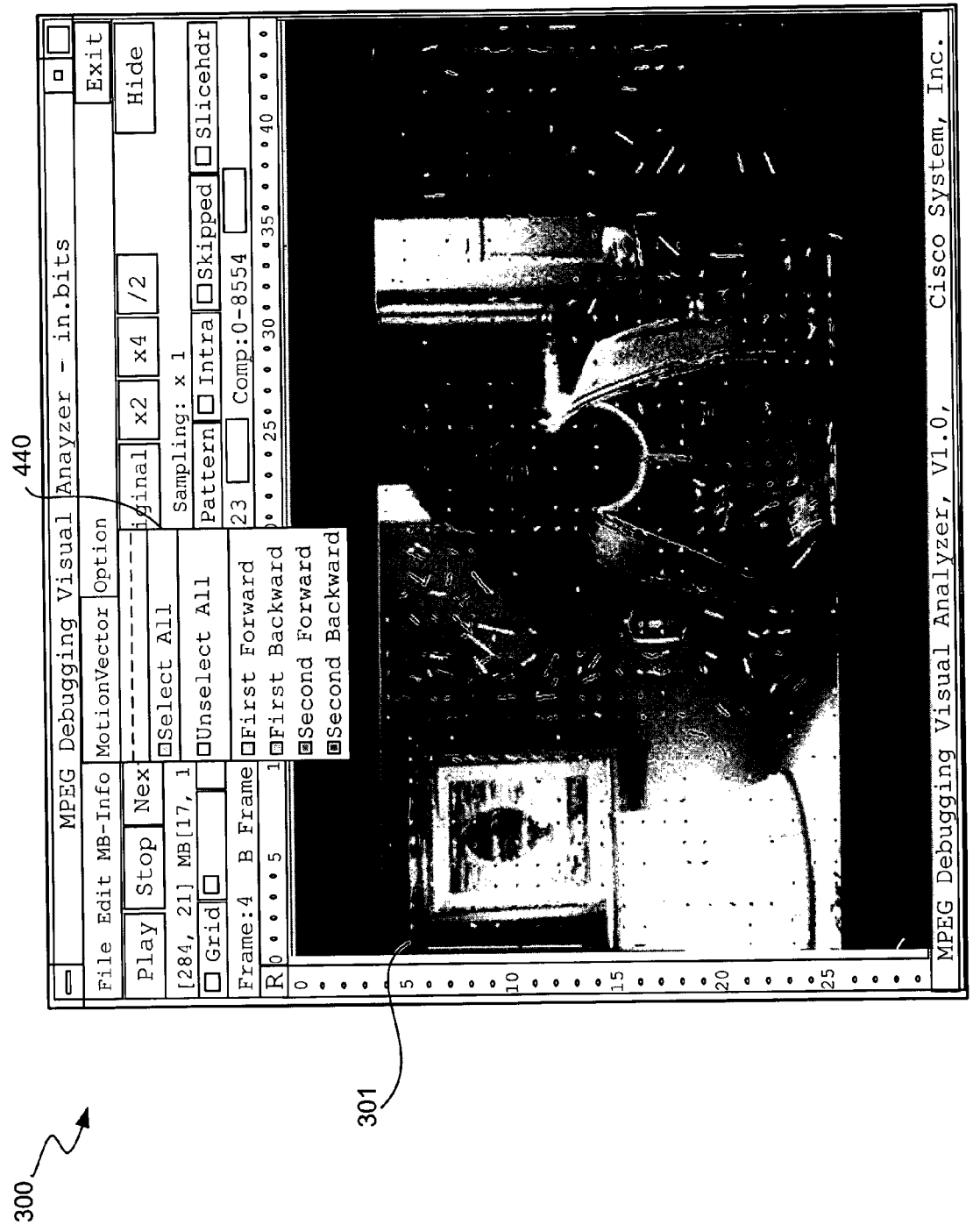
FIG. 5C illustrates a motion vector pop-up menu that permits a user to display one, multiple, or all of the motion vectors for each segment in an image included in the analysis tool of FIG. 1.
Figure 5D:
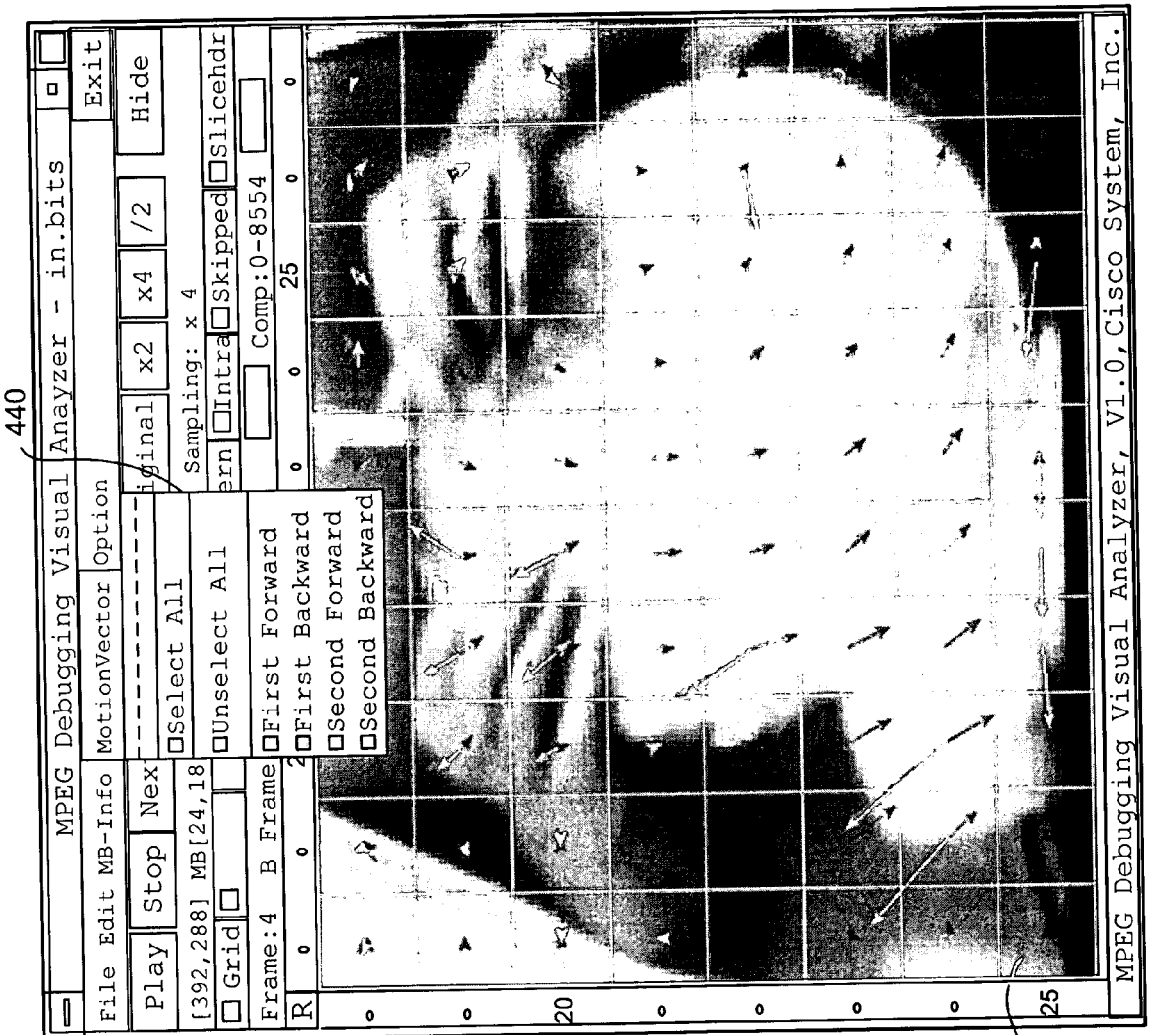
FIG. 5D illustrates a close up of a portion of the image of FIG. 5C and the motion vectors for each segment in the portion.

The analysis tool 300 also includes numerous other user interface tools. For example, motion vector pop-up menu 440 allows a user to display one, multiple, or all of the motion vectors for each macroblock 323 in image 302 (that is, if each type of motion vector is present for a macroblock). As shown in FIG. 5C, all of the motion vectors for each macroblock 323 are selected for display using motion vector pop-up menu 440. Correspondingly, motion vectors for each macroblock 323 are displayed as shown in window 301. FIG. 5D illustrates a close up of a portion 441 of image 302 and the motion vectors for each macroblock 323 in portion 441. In this case, each of the four types of motion vector (first forward motion vector, first backward motion vector, second forward motion vector, second backward motion vector) are color coded to facilitate illustration.

As shown in FIG. 5E, option pop-up menu 460 includes an order of display tool 462, image tool 464, and view tool 466. Display tool 462 permits a user to change the order of display of output video images. For example, a user may select a bitstream order 465 and provide output images in the order that the raw video data was encoded in the compressed bitstream. Alternatively, a user may select picture display order 463 and provide output images in the order of decoded output for presentation.

Figure 5F:
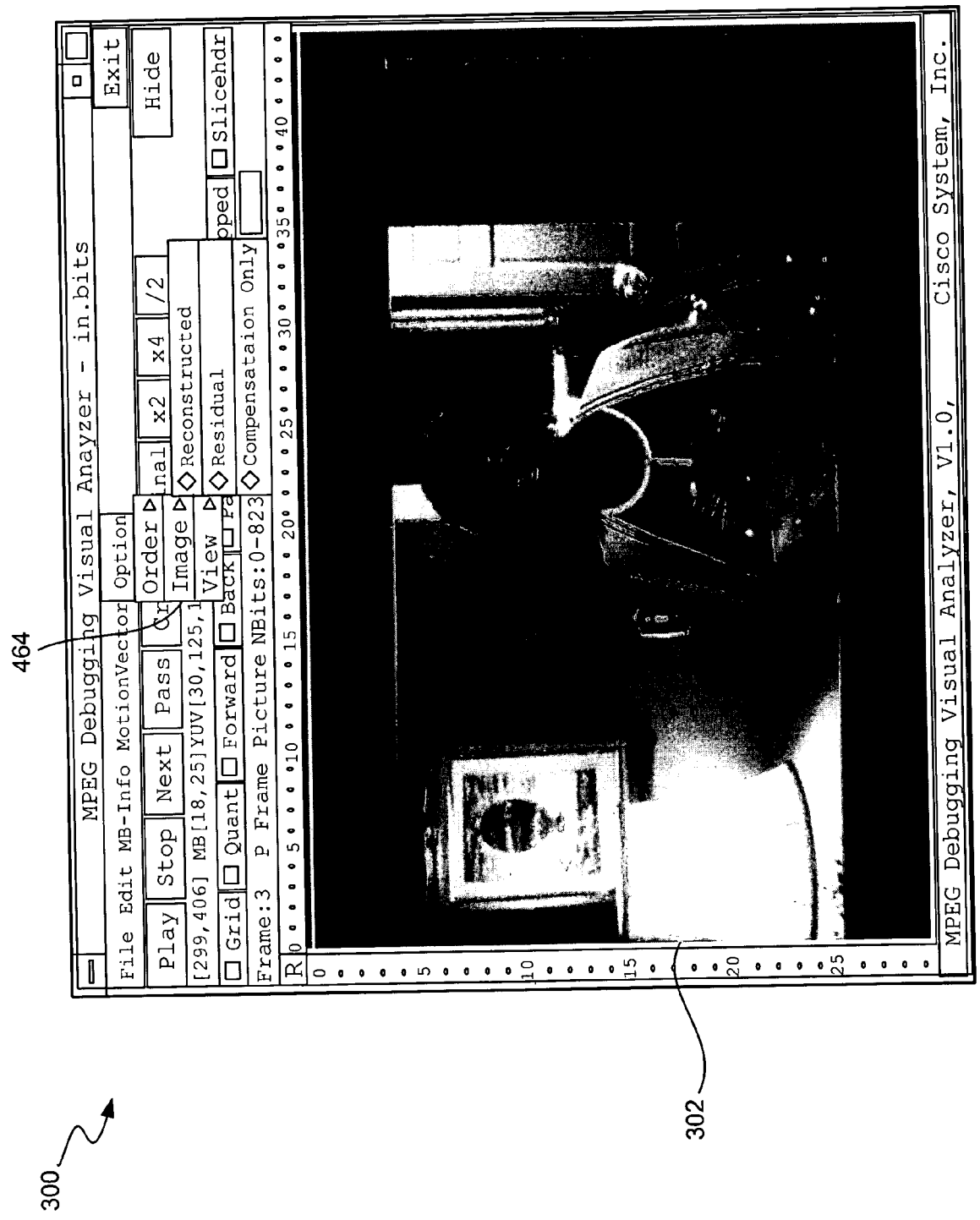
FIG. 5F illustrates an option pop-up menu tool that permits a user to illustrate an image at different decoding stages in the analysis tool of FIG. 1.
Figure 5G:
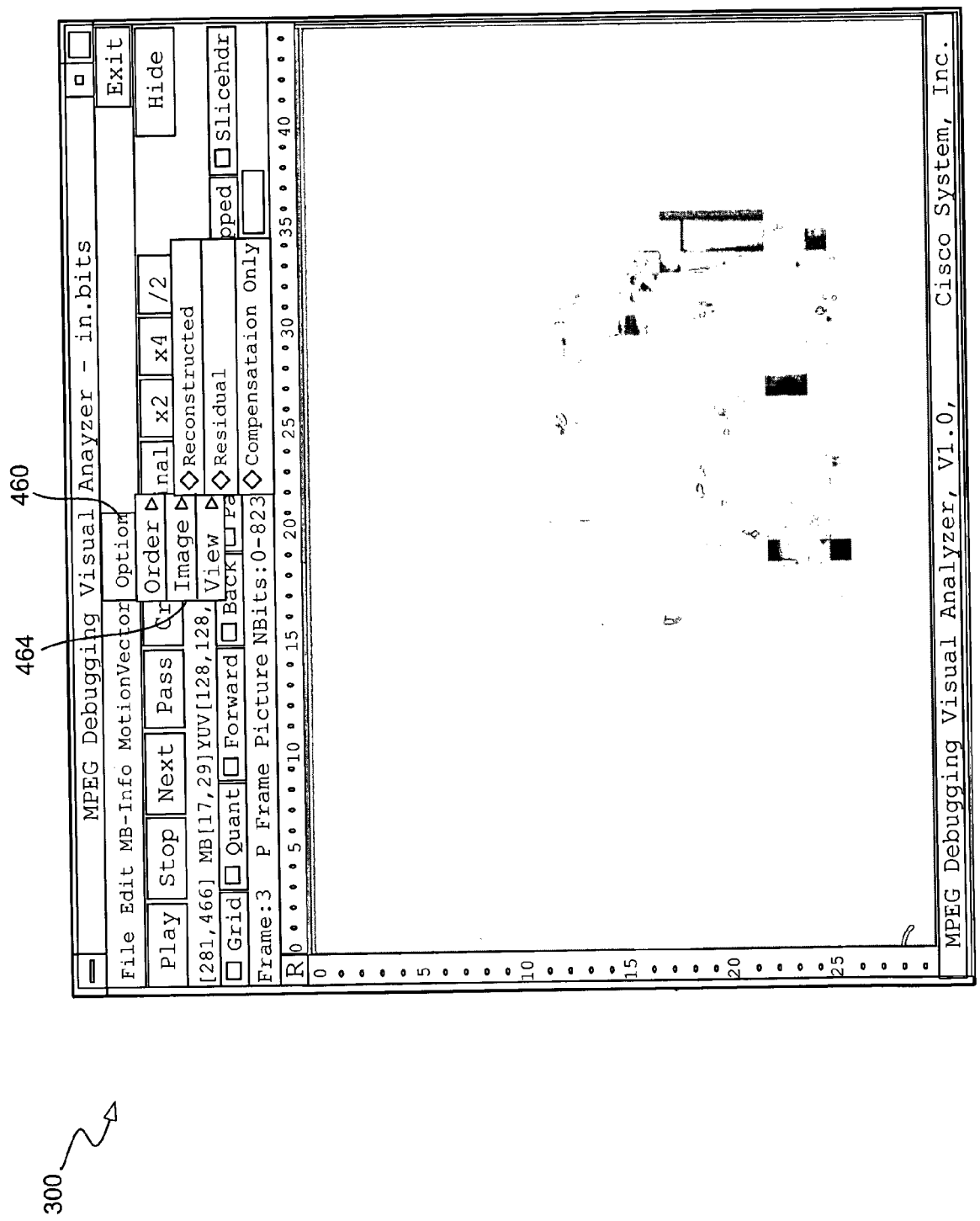
FIG. 5G illustrates a residual image that only provides residual data for the current image included in the analysis tool of FIG. 1.

Image tool 464 permits a user to illustrate image 302 at different decoding stages (see FIG. 5F). For example, using image tool 464, a user may display image 302 in image window 321 according to (i) a reconstructed image that is fully decoded (FIG. 1 for example), (ii) a residual image that only provides residual data for the current image (see FIG. 5G), or (iii) a compensation image that only shows picture data derived from motion compensation.

Figure 5H:
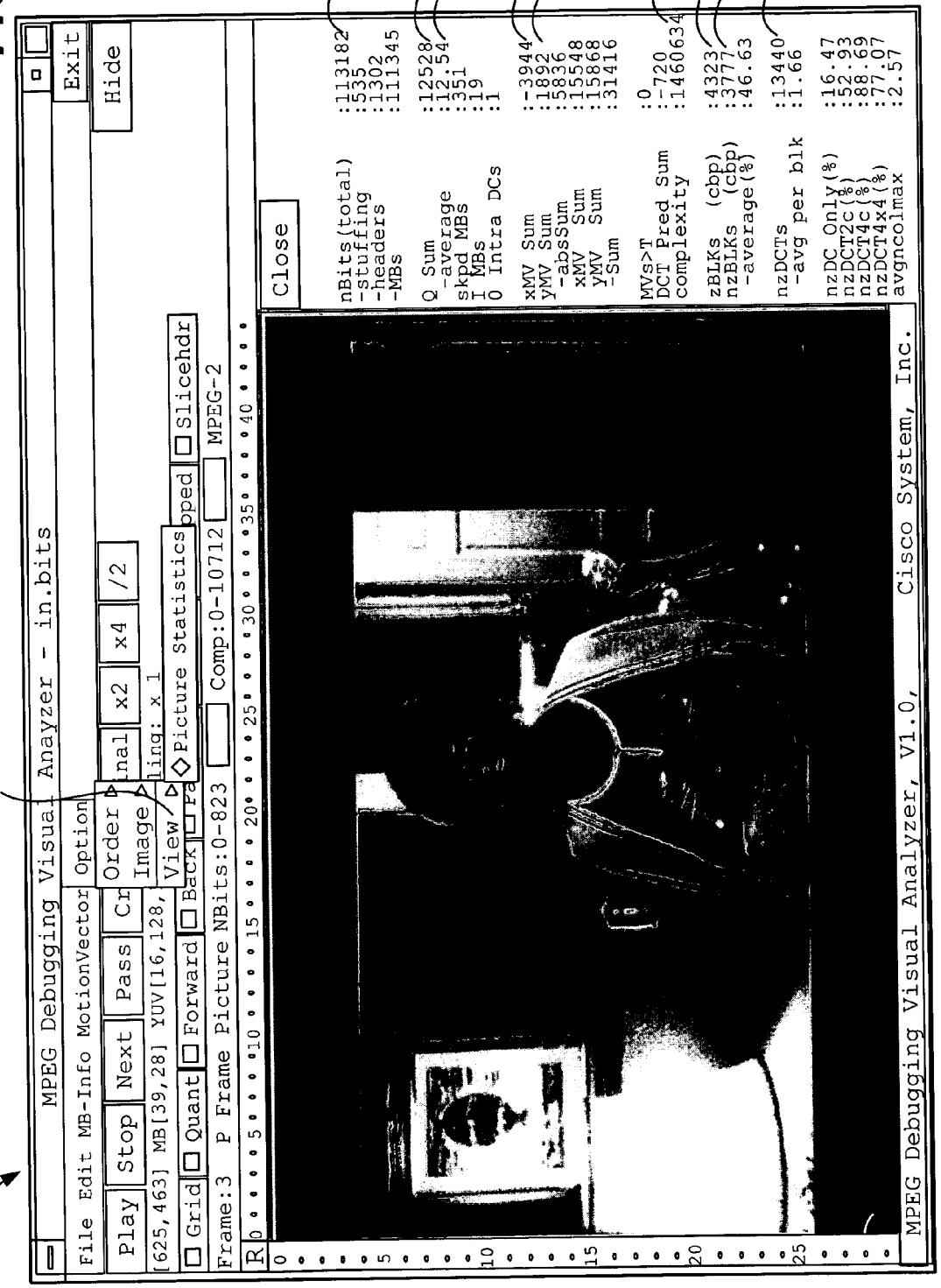
FIG. 5H illustrates a view tool that permits a user to open a side window that displays picture level statistics included in a picture displayed using the analysis tool of FIG. 1.

Referring to FIG. 5H, view tool 466 permits a user to open a side window that displays picture level statistics such as the total number of bits for this picture 470, sum of quantization scale values 471 and its average per macroblock 472, sum of motion vector values in the X (horizontal) direction 473 and Y (vertical) direction 474, total complexity 475, number of zero blocks 476 and non-zero blocks 477, total number of non-zero DCT coefficients 478, and so on.

Figure 6:
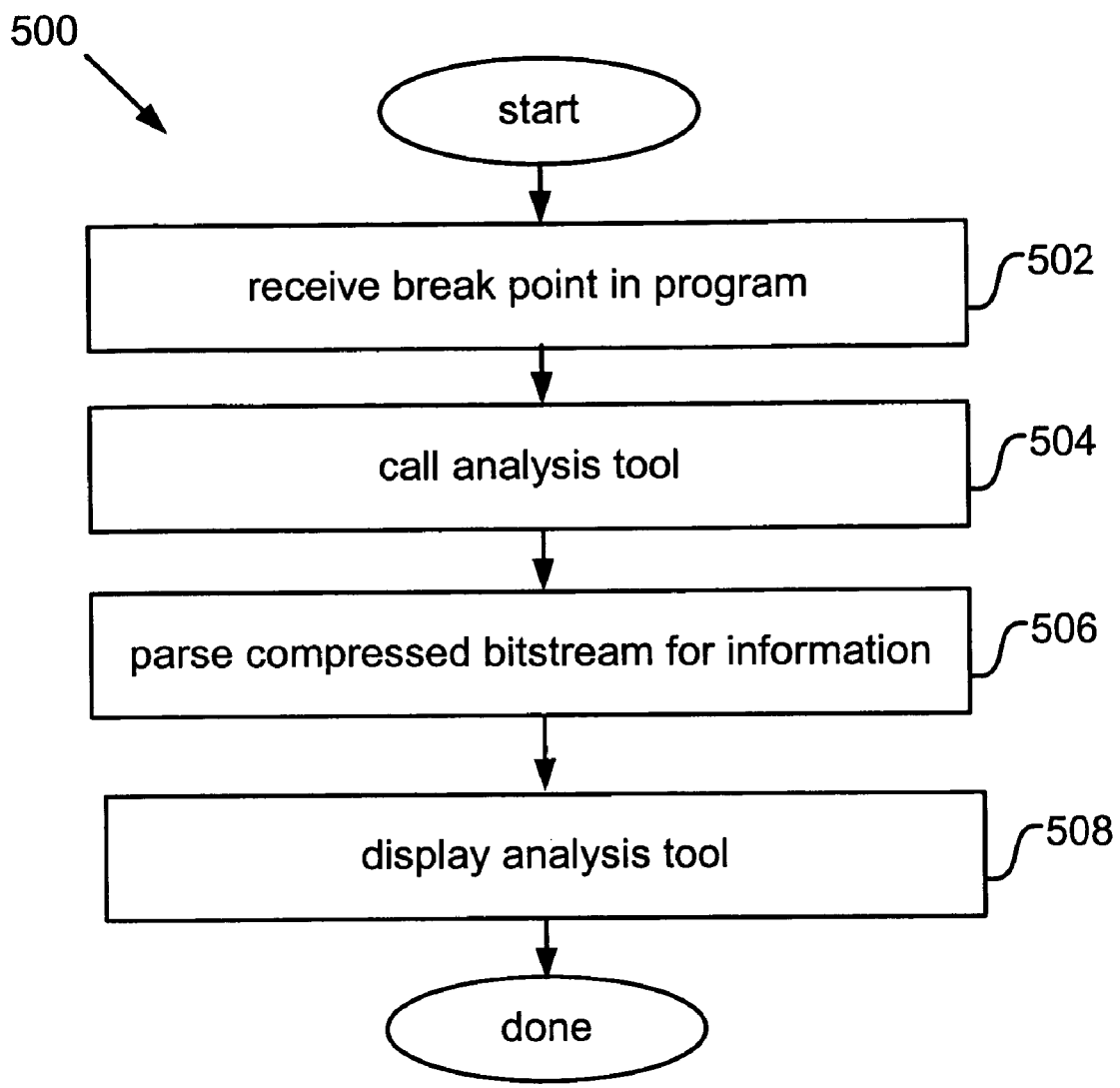
FIG. 6 is a process flow representative of a method for using analysis tool in accordance with a specific embodiment of the present invention.

FIG. 6 is a process flow 500 representative of a method for using analysis tool 300 in accordance with a specific embodiment of the present invention. Process flow 500 is typically implemented by a user on a computer of some sort having a display and a processor, as will be described with more detail below. Processes in accordance with the present invention may include up to several additional steps not described or illustrated here in order not to obscure the present invention. While video data analysis tools will now be described as a method of their implementation, those skilled in the art will recognize that the present invention encompasses a system or software having units capable of performing the actions as described below.

Process flow 500 typically begins within a computer program [or a product software] that processes the compressed video data and that the program developer is debugging. The analysis tool is integrated with the product software. Firstly, a processor implementing process flow 500 processes [e.g., parses] a bitstream comprising the compressed video data being analyzed or manipulated by the program (506). During this processing or parsing, compressed video data information is located and extracted from the bitstream and/or processed(manipulated) by the production software. This information includes compression information for each of the display tools described with respect to analysis tool 300. As one of skill in the art will appreciate, this information may separately be contained in specific portions of the bitstream, as defined by the MPEG Specification. In addition, some of the compressed video data information may be manipulated or altered to provide parameters useful for video data or program analysis. In a specific embodiment, a quantity that indicates program efficacy is generated. For example, if the program is responsible for bit rate reduction of video data in a compressed bitstream, then a complexity measure for a portion of the video data may be useful to indicate the relative amount of computation for the bit rate reduction for an image, or portion thereof. Complexity 350 described above is particularly useful in this regard. In addition, video data processing results generated by the program can be obtained by the analysis tool 300 for display. For example, compressed video data after transcoding process can be decoded for display using analysis tool 300.

Figure 5I:
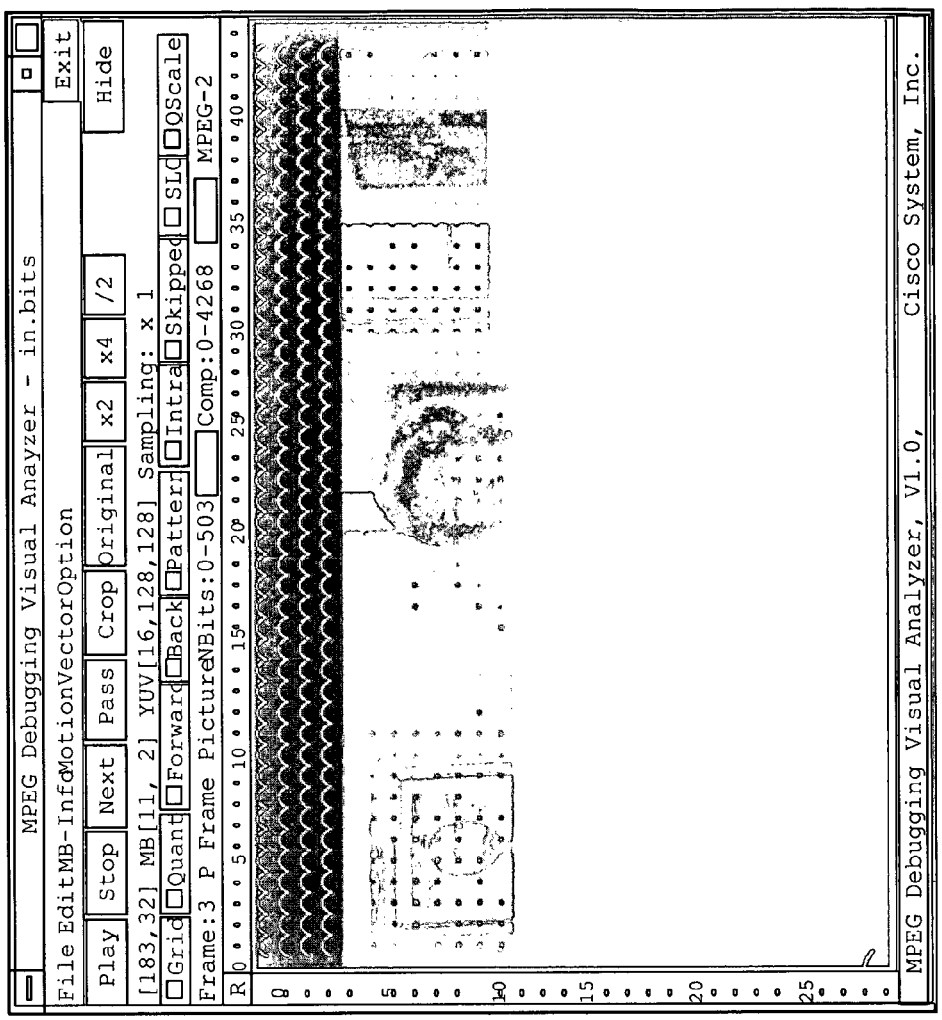
FIG. 5I illustrates a break point inserted in a program suitable for invoking the analysis tool of FIG. 1.

Secondly, process flow 500 also comprises receiving a break point in the program (502) at a location that is desired by the user in a suitable debugging environment. The break point is configured at a location to call an image analysis tool such as analysis tool 300. MPEG decoding/encoding/transcoding program is commonly written in the C programming language. The break point generally refers to a location at a particular instance in a program where the program will stop during execution as supported by a debugger, and a suitable example of a break point 505 is illustrated in FIG. 5I. Break point 505 is inserted next to a line of code 507 in the program. When the break point/line of code 507 is reached, a user may then invoke analysis tool 300 in the C code. Using a break point in the source code in this manner allows the user to easily integrate the analysis tool 300 into various locations of a program. For example, a user may insert the breakpoint in a program to view a particular frame at a particular point in the program. Alternatively, a programmer may change relevant parameters within the program and call the analysis tool in various instances of the program to witness the effects of changing the parameters. Advantageously, this allows analysis tool 300 to be used as a debugging tool that provides the user a flexible visual aid for program analysis and efficacy.

In a specific embodiment, a break point suitable for use with the C programming language is at a function that calls a separate program that invokes analysis tool 300. It is contemplated that other programming languages may be used other than C for programming to effect video data and invoke analysis tool 300. In addition, the ability to invoke analysis tool 300 using a programming language of choice allows analysis tool 300 to be implemented with a wide variety of programming languages and platforms. In one embodiment, analysis tool 300 is implemented using the Tcl/Tk programming language. In this case, invoking the analysis tool calls various Tcl/Tk functions configured to transmit the parsed compression data and analysis results from the video-processing program to the analysis tool 300 implemented in Tcl/Tk. In general, as long as the video-processing program written in other languages can talk to the programming language used to implement the analysis tool 300, the analysis tool 300 can be integrated with video-processing program and used in the same way as this embodiment. Thus the present invention allows for other programming languages to call or invoke analysis tool 300.

Thirdly, when the break point is reached in the program (e.g., during execution), it calls an image analysis tool (504). When the analysis tool 300 is called, the analysis tool 300 obtains data parsed by process 506 and generated by the video-processing program.

The analysis tool is then visually output on a display such as a monitor (508). This may include visually outputting raw video data and compressed video data information using the image analysis tool, as determined by the user. The user may then proceed to gather information on one or more portions of the video representation using display tools of the analysis window. The user may analyze different images, compare data between images, etc. If the user is finished with analysis, then the user may exit. It should be noted that the process flow 500 is one method of using the analysis tool 300 for analysis of video data. Obviously, many of the elements of the process flow 500 may be repeated or performed outside of the order illustrated.

Figure 7A:
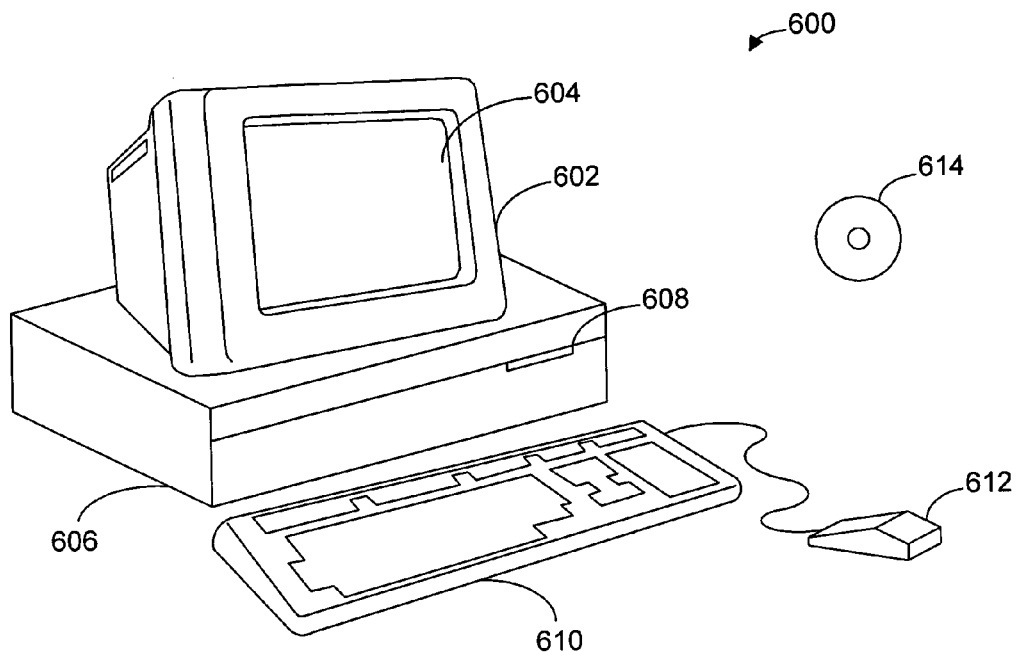
FIGS. 7A and 7B illustrates a computer system that can be employed to implement the present invention.
Figure 7B:
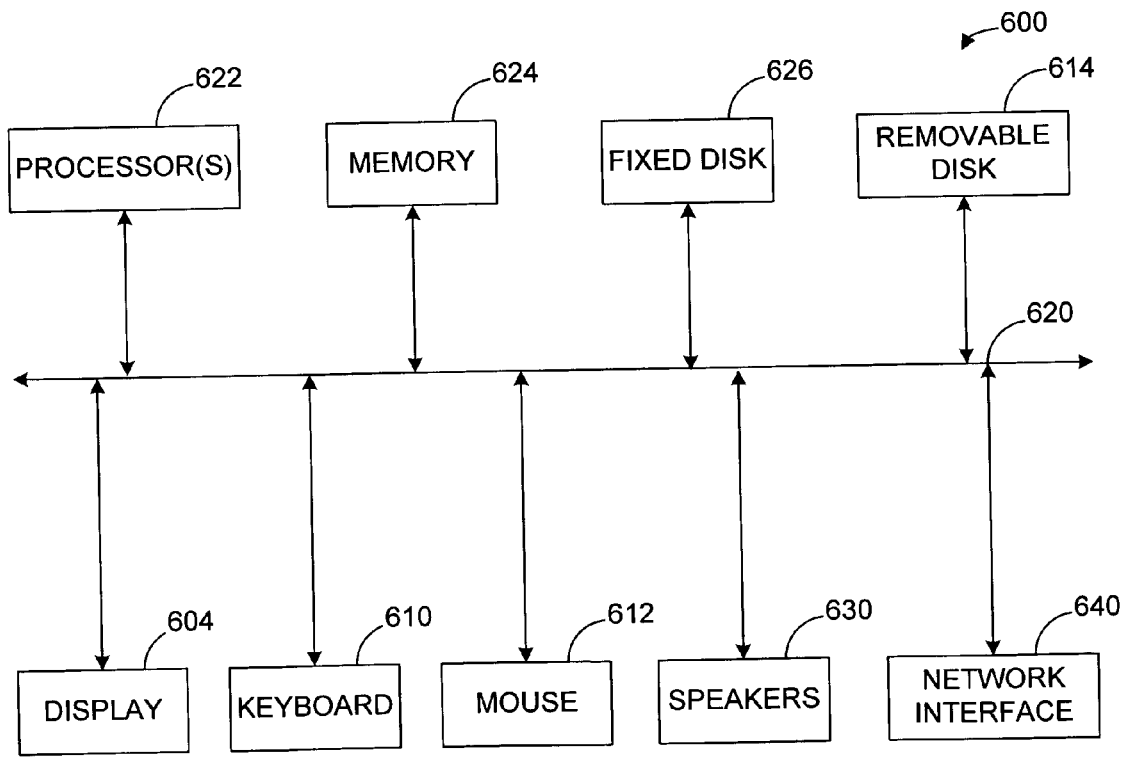

FIGS. 7A and 7B illustrates a computer system 600 that can be employed to implement the present invention. FIG. 7A shows one possible physical form of the computer system. Of course, the computer system may have many physical forms ranging from an integrated circuit, a printed circuit board and a small handheld device up to a huge super computer. Computer system 600 includes a monitor 602, a display 604, a housing 606, a disk drive 608, a keyboard 610 and a mouse 612. Disk 614 is a computer-readable medium used to transfer data to and from computer system 600.

FIG. 7B is an example of a block diagram for computer system 600. Attached to system bus 620 are a wide variety of subsystems. Processor(s) 622 (also referred to as central processing units, or CPUs) are coupled to storage devices including memory 624. Memory 624 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 626 is also coupled bi-directionally to CPU 622; it provides additional data storage capacity and may also include any of the computer-readable media described below. Fixed disk 626 may be used to store programs, data and the like and is typically a secondary storage medium (such as a hard disk) that is slower than primary storage. It will be appreciated that the information retained within fixed disk 626, may, in appropriate cases, be incorporated in standard fashion as virtual memory in memory 624. Removable disk 614 may take the form of any of the computer-readable media described below.

CPU 622 is also coupled to a variety of input/output devices such as display 604, keyboard 610, mouse 612 and speakers 630. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 622 optionally may be coupled to another computer or telecommunications network using network interface 640. With such a network interface, it is contemplated that the CPU might receive information from the network, or might output information to the network in the course of performing the above-described method steps. Furthermore, method embodiments of the present invention may execute solely upon CPU 622 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the present invention has been discussed primarily in the context of making measurements for the summation of photon counts within the image measurement window 301, the present invention is suitable for other imaging applications and may be tailored correspondingly. By way of example, the present invention may be adapted for analysis of high detail in-vivo applications and thus may include zoom tools in the display function section 306. Other applications may implement global image processing procedures well known in the image processing arts. For example, binning may be implemented to account for insufficient information per pixel. More specifically, the number of pixels in each direction of the luminescence representation may be halved to produce a new pixel array comprising the magnitude of four previous pixels in a single new pixel to improve statistical analysis. Although various details have been omitted for brevity's sake, obvious design alternatives may be implemented. Therefore, the present examples are to be considered as illustrative and not restrictive, and the invention is not to be limited to the details given herein, but may be modified within the scope of the appended claims.

While this invention has been described in terms of several preferred embodiments, there are alterations, permutations, and equivalents that fall within the scope of this invention which have been omitted for brevity's sake. By way of example, although the present invention has been described in terms of several numerous applied material electrodes, the present invention is not limited to these materials and in some cases may include air as an electrode. It is therefore intended that the scope of the invention should be determined with reference to the appended claims.

What is claimed is:

1. A method implemented on a computer system, the method comprising:
   processing a bitstream comprising compressed video data by a video processing program;
   calling an image analysis tool when a break point is reached, wherein the break point identifies a location in the video processing program;
   obtaining compressed video data information from the bitstream via the image analysis tool; and
   visually outputting the compressed video data information using the image analysis tool.

2. The method of claim 1 wherein the compressed video data information comprises statistical information related to the compression of the video data.

3. The method of claim 1 wherein the compressed video data information is visually output according to a segment.

4. The method of claim 3 wherein the video data is compressed according to an MPEG standard.

5. The method of claim 3 wherein the compressed video data information is visually output according to a macroblock.

6. The method of claim 5 wherein the compressed video data information includes a forward motion vector or a backward motion vector for one or more macroblocks.

7. The method of claim 5 wherein the compressed video data information includes a quantization value for one or more macroblocks.

8. The method of claim 1 further comprising generating a quantity that indicates complexity for processing the compressed video data.

9. The method of claim 8 wherein the quantity is a complexity measure for a portion of the compressed video data.

10. The method of claim 8 wherein the quantity is a complexity measure for a picture included in the compressed video data.

11. The method of claim 1 wherein the analysis tool is integrated with the video processing program.

12. The method of claim 1 wherein the analysis tool is integrated in a debugging program.

13. The method of claim 1 wherein the image analysis tool is called during execution of the video processing program.

14. The method of claim 13 wherein the video processing program is responsible for transcoding the compressed video data.

15. The method as recited in claim 1, wherein the break point is at the location in the video processing program.

16. The method as recited in claim 15, wherein the breakpoint includes computer code.

17. A computer program product comprising a computer readable medium and program instructions provided via a computer readable medium, the program instructions comprising instructions for providing an image analysis tool presented on a display associated with a computer system, the instructions specifying:

processing a bitstream comprising compressed video data by a video processing program;

calling an image analysis tool when a break point is reached, wherein the break point identifies a location in the video processing program;

obtaining compressed video data information from the bitstream via the image analysis tool; and visually outputting the compressed video data information using the image analysis tool.

18. The computer program product of claim 17 further comprising instructions for generating a quantity that indicates complexity for processing the compressed video data.

19. The computer program product of claim 17 wherein the compressed video data information is visually output according to a segment.

20. The computer program product of claim 19 wherein the compressed video data information is visually output according to a macroblock.

21. A system for providing an image analysis tool presented on a display associated with a computer system that processes a compressed bitstream, the system comprising:

means for processing a bitstream comprising compressed video data by a video processing program;

means for calling an image analysis tool when a break point is reached, wherein the break point identifies a location in the video processing program;

means for obtaining compressed video data information from the bitstream via the image analysis tool; and means for visually outputting the compressed video data information using the image analysis tool.

22. The system of claim 21 wherein the compressed video data information is visually output according to a segment.

23. The system of claim 22 wherein the compressed video data information is visually output according to a macroblock.

24. The system of claim 21 further comprising means for generating a quantity that indicates complexity for processing the compressed video data.

* * * * *

UNITED STATES PATENT AND TRADEMARK OFFICE
CERTIFICATE OF CORRECTION

PATENT NO. : 7,536,643 B2  Page 1 of 1
APPLICATION NO. : 11/206475
DATED : May 19, 2009
INVENTOR(S) : Zhu et al.

It is certified that error appears in the above-identified patent and that said Letters Patent is hereby corrected as shown below:

TITLE PAGE:

Add the following section and information:

--Related U.S. Application Data

(62) Division of application No. 10/013,967, filed on December 10, 2001, now Pat. No. 6,948,127--

Signed and Sealed this

Eighteenth Day of May, 2010

David J. Kappos
*Director of the United States Patent and Trademark Office*